United States Patent
Kodama

(10) Patent No.: US 7,171,532 B2
(45) Date of Patent: Jan. 30, 2007

(54) METHOD AND SYSTEM FOR DATA LIFECYCLE MANAGEMENT IN AN EXTERNAL STORAGE LINKAGE ENVIRONMENT

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 10/928,280

(22) Filed: Aug. 30, 2004

(65) Prior Publication Data

US 2006/0047923 A1    Mar. 2, 2006

(51) Int. Cl.
G06F 12/00    (2006.01)

(52) U.S. Cl. .................... 711/165; 711/114; 709/203

(58) Field of Classification Search .............. None
See application file for complete search history.

(56) References Cited

U.S. PATENT DOCUMENTS

| | | | |
|---|---|---|---|
| 5,584,018 A | | 12/1996 | Kamiyama |
| 5,664,187 A | | 9/1997 | Burkes et al. |
| 6,108,748 A | | 8/2000 | Ofek et al. |
| 6,230,239 B1 | * | 5/2001 | Sakaki et al. ............... 711/112 |
| 6,275,898 B1 | | 8/2001 | DeKoning et al. |
| 6,546,404 B1 | | 4/2003 | Davis et al. |
| 2001/0054133 A1 | | 12/2001 | Murotani et al. |
| 2002/0184463 A1 | * | 12/2002 | Arakawa et al. ............ 711/170 |
| 2003/0120684 A1 | * | 6/2003 | Zuili et al. ................... 707/200 |
| 2003/0140207 A1 | | 7/2003 | Nagase et al. |
| 2003/0140210 A1 | | 7/2003 | Testardi |
| 2003/0208614 A1 | * | 11/2003 | Wilkes ....................... 709/232 |
| 2004/0133608 A1 | | 7/2004 | Saake et al. |
| 2004/0143832 A1 | | 7/2004 | Yamamoto et al. |
| 2005/0268121 A1 | * | 12/2005 | Rothman et al. ............ 713/300 |
| 2005/0283564 A1 | * | 12/2005 | LeCrone et al. ............ 711/100 |

* cited by examiner

*Primary Examiner*—Reginald Bragdon
*Assistant Examiner*—Thanh D. Vo
(74) *Attorney, Agent, or Firm*—Mattingly, Stanger, Malur & Brundidge, P.C.

(57) ABSTRACT

A system and method for data lifecycle management. In one embodiment, data is migrated from a source physical volume at a primary storage system to a target physical volume at an external storage system. The data from the source physical volume is copied to the target physical volume. When a request is received at the primary storage system from a server to access the data in the target physical volume, the server is added as an owner of the target physical volume, sent location information of the target physical volume, and allowed to access the target physical volume directly without passing through the primary storage system. The volume for migration may be determined based on not having been accessed for a specified period or having been specified by a user or an application to be migrated. Extents, objects and files may also be migrated.

9 Claims, 22 Drawing Sheets

Downward Volume Migration (Volume Based)

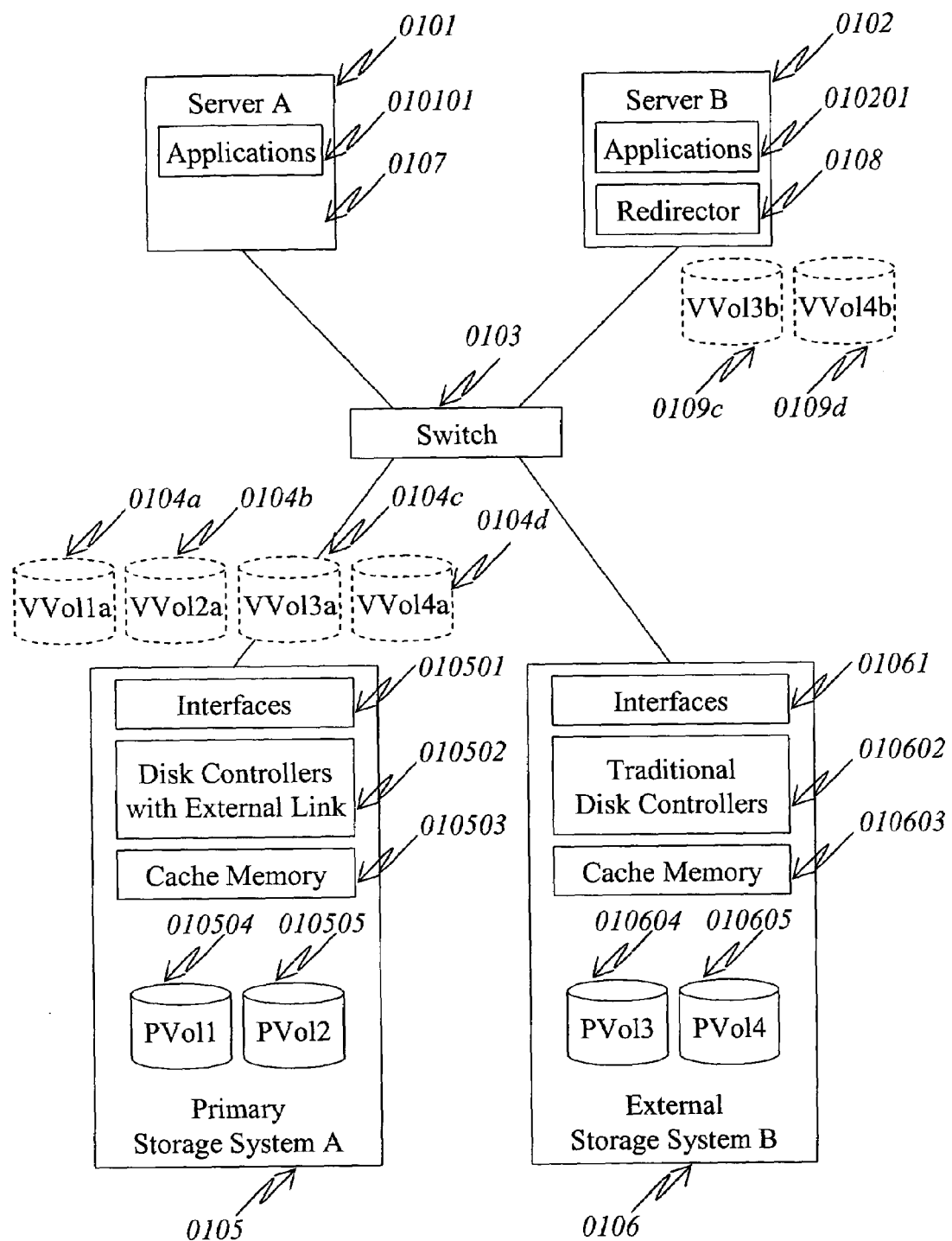
Figure 1: System Configuration A (Volume Based System)

| Virtual Volumes | Location | Storage System | Physical Volume |
|---|---|---|---|
| VVol1a | Internal | Storage System A | PVol1 |
| VVol2a | Internal | Storage System A | PVol2 |
| VVol3a | External | Storage System B | PVol3 |
| VVol4a | External | Storage System B | PVol4 |

0401

*Figure 2: Virtual-Physical Volume Mapping Table of Storage System A (Volume Based)*

| Virtual Volumes | Cache | Owners |
|---|---|---|
| VVol1a | Yes | Storage System A |
| VVol2a | Yes | Storage System A |
| VVol3a | Yes | Storage System A |
| VVol4a | No | Storage System A, Server B |

1101

*Figure 3: Virtual Volume Management Table (Volume Based and Extent Based)*

| Storage System | Physical Volume | Capacity | Availability |
|---|---|---|---|
| Storage System A | pVol5 | 20GB | No |
|  | pVol6 | 17GB | Yes |
| Storage System B | pVol7 | 80GB | No |
|  | pVol8 | 100GB | Yes |

1401

*Figure 4: Free Volume List (Volume Based)*

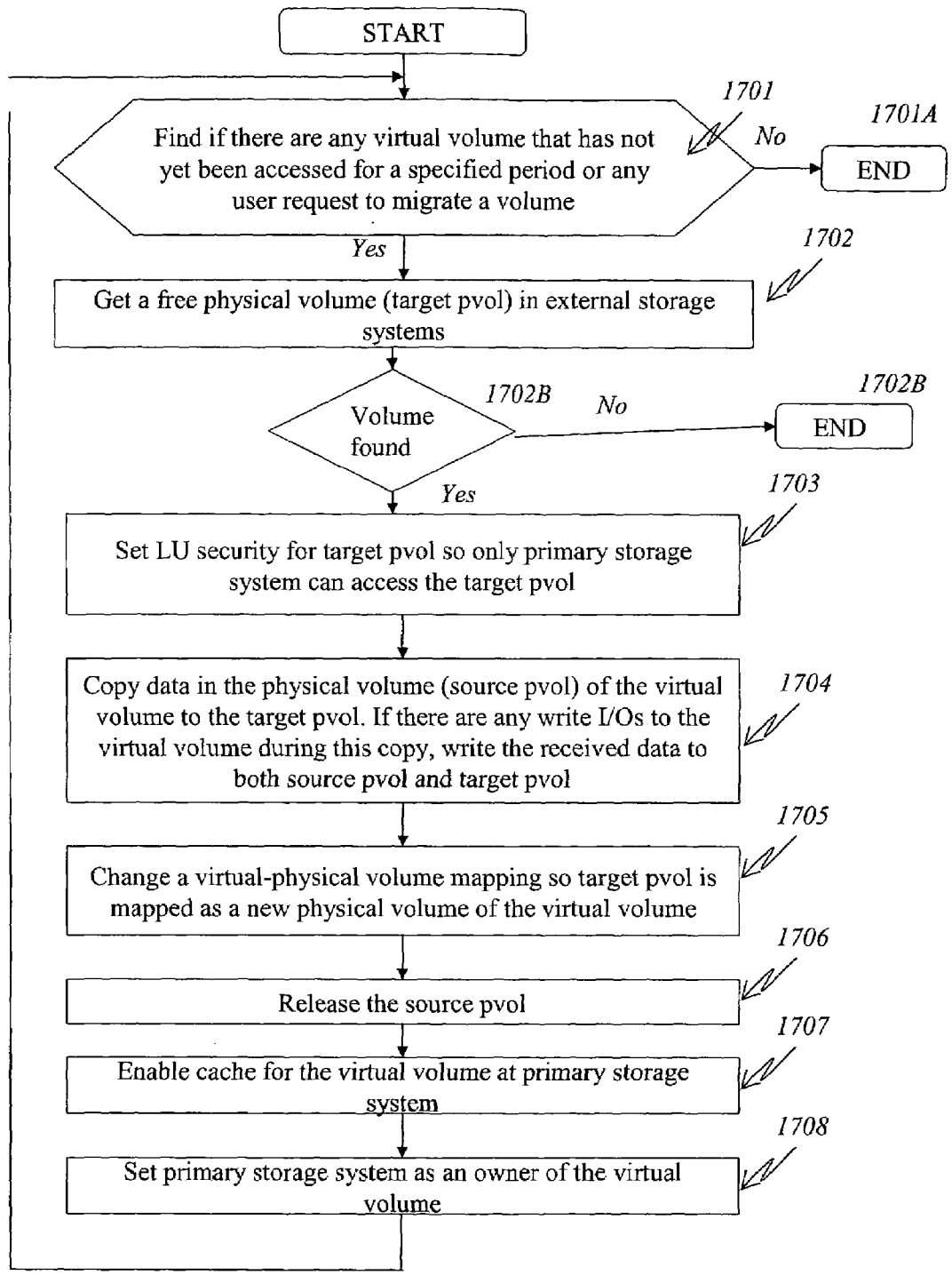
Figure 5: Downward Volume Migration (Volume Based)

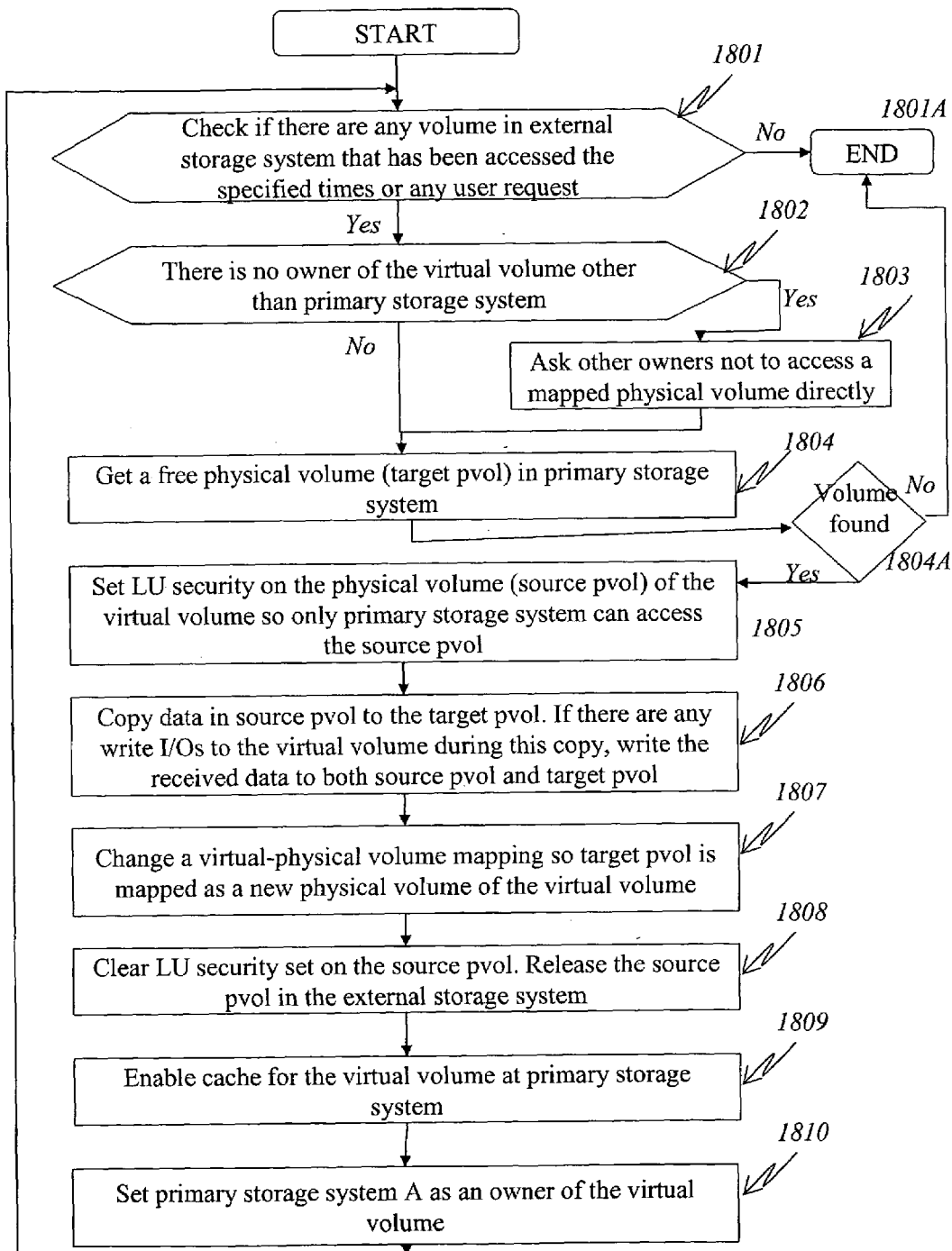
Figure 6: Upward Volume Migration (Volume Based)

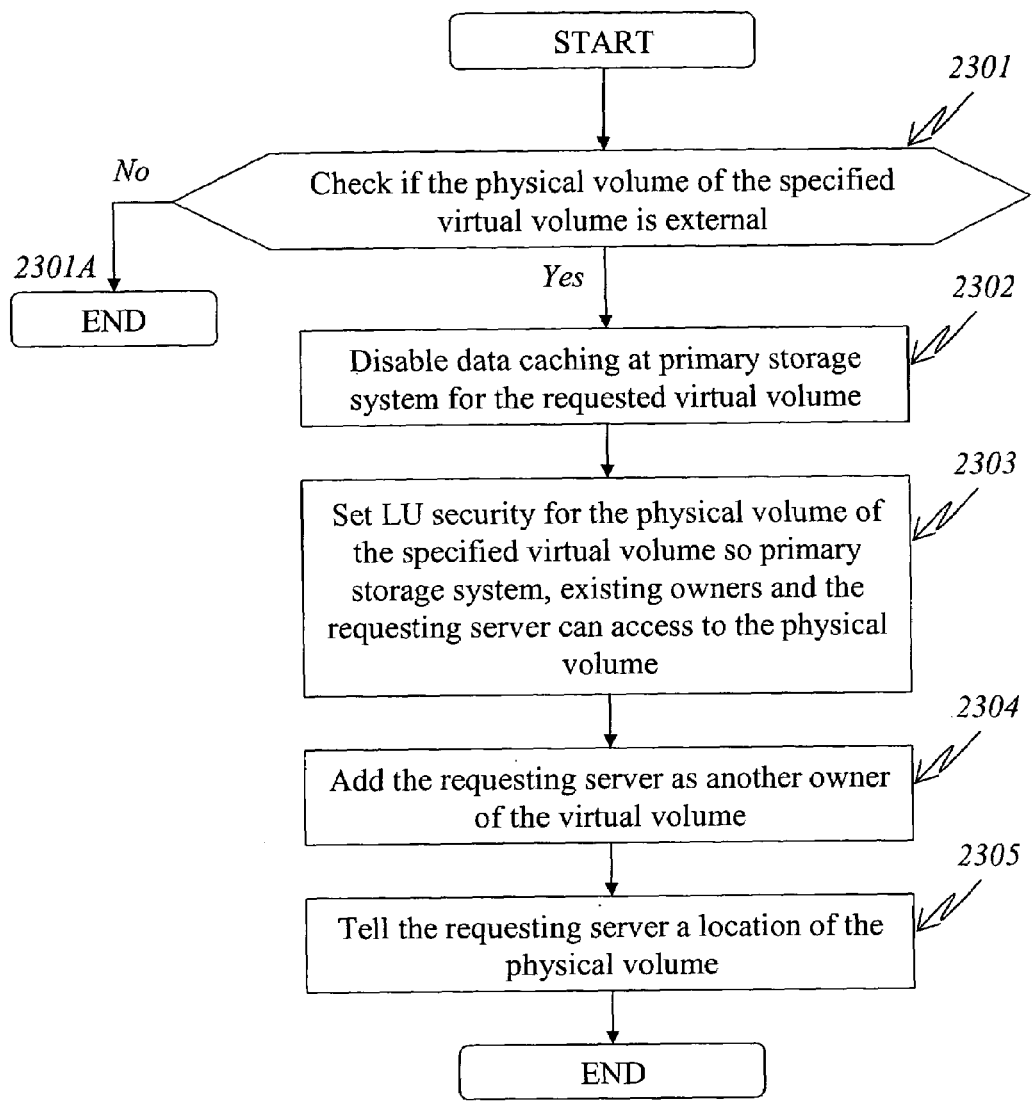
Figure 7: Processing Direct Volume Access Request (Volume Based)

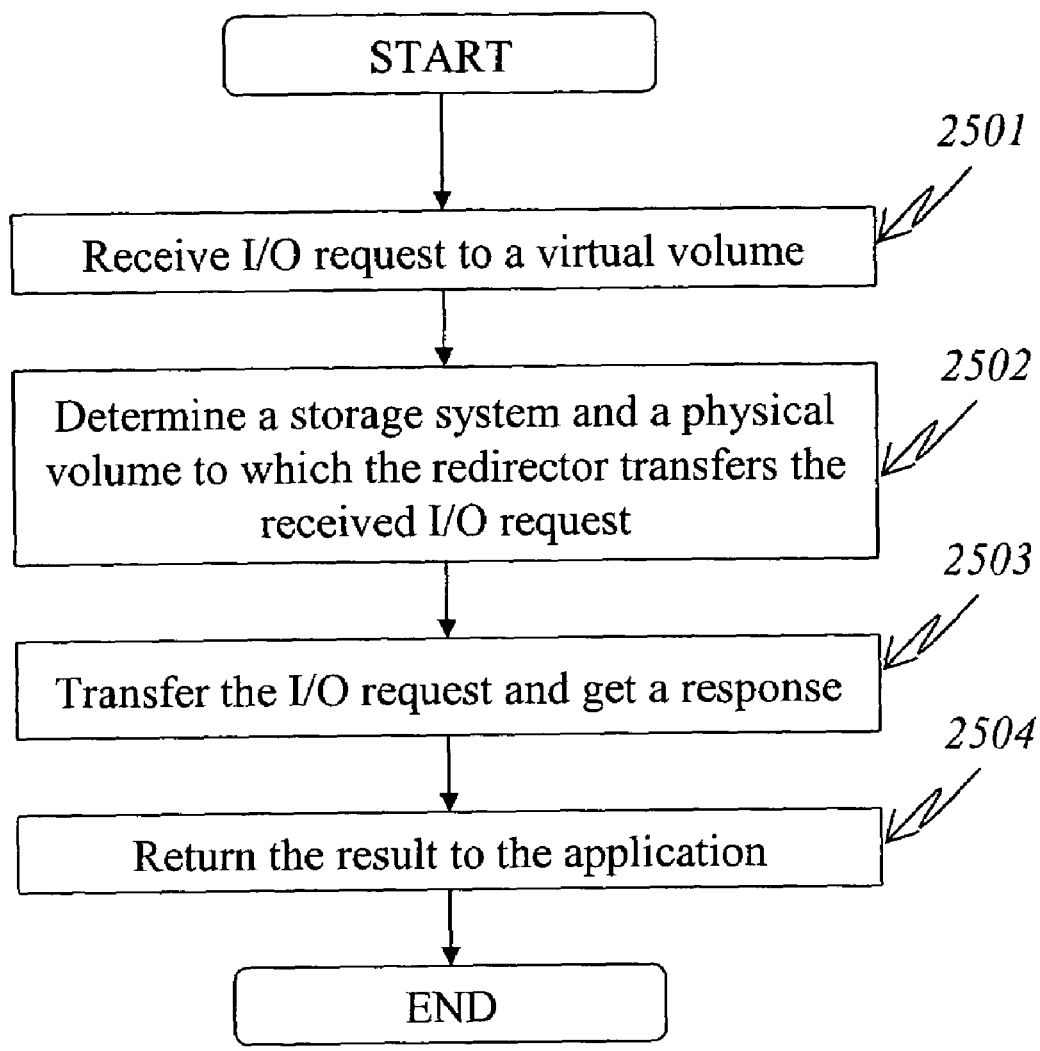
*Figure 8: Redirector (Volume Based)*

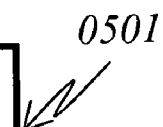
*Figure 9: Virtual-Physical Volume Mapping Table of Redirector on Server B (Volume Based)*

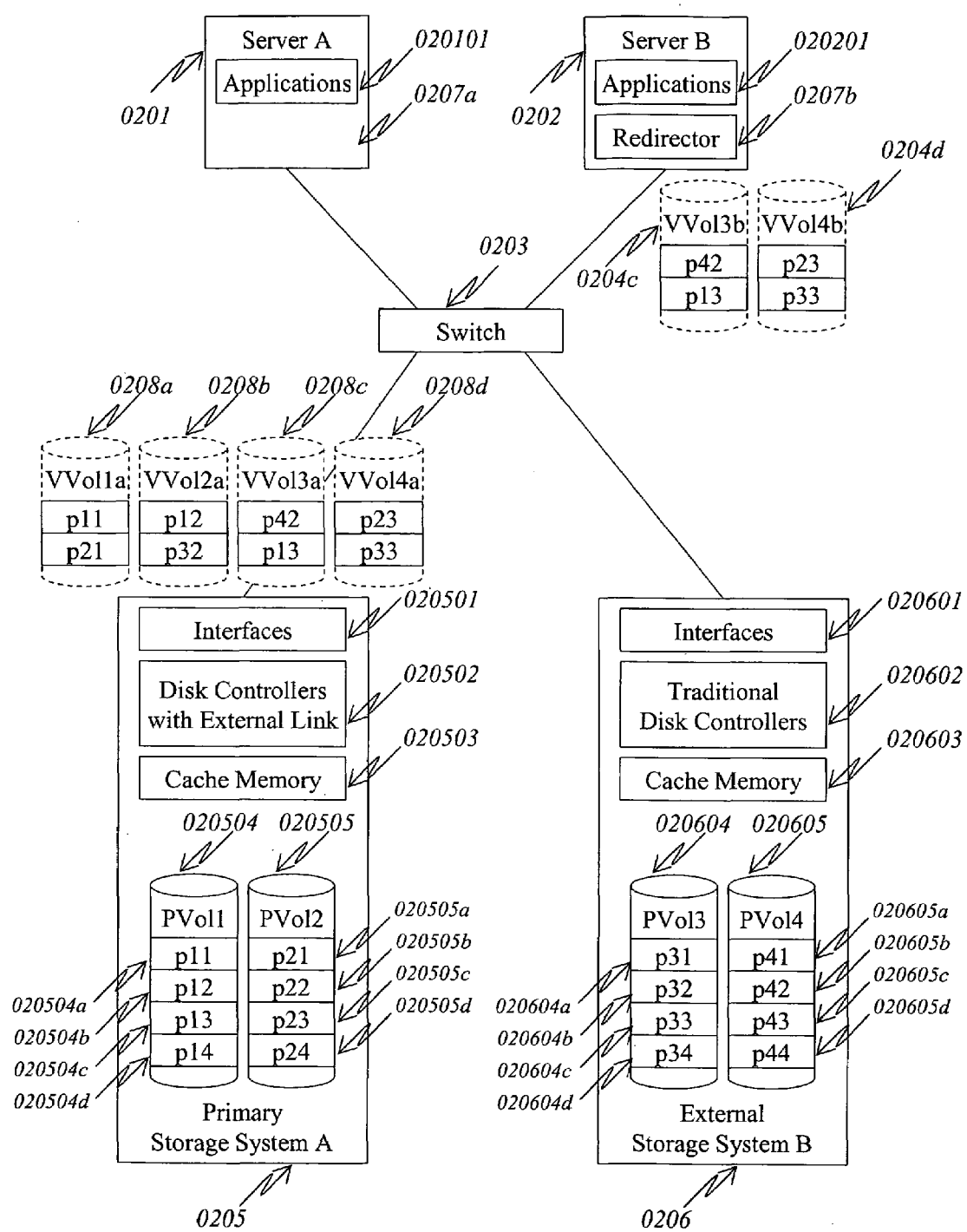
Figure 10: System Configuration B (Extent or Disk-Block Based System)

0601

| Offsets | Location | Storage System | Physical Volume | Extent |
|---|---|---|---|---|
| 0 | External | Storage System B | PVol4 | Extent42 |
| 100 | Internal | Storage System A | PVol1 | Extent13 |
| 200 | External | Storage System B | PVol3 | Extent31 |
| ⋮ | ⋮ | ⋮ | ⋮ | ⋮ |
| N | External | Storage System B | PVol2 | Extent22 |

*Figure 11: Virtual-Physical Extent Mapping Table for VVol3a
of Storage System A
and Virtual-Physical Extent Mapping Table for VVol3b
of Server B
(Extent Based)*

1501

| Storage System | Physical Volume | Extent | Capacity | Availability |
|---|---|---|---|---|
| Storage System A | pVol5 | Extent51 | 10MB | No |
| | | Extent52 | 5MB | Yes |
| | | Extent5n | 80MB | No |
| Storage System B | pVol6 | Extent61 | 17MB | Yes |
| | | Extent62 | 3MB | No |
| | | Extent6m | 20MB | No |

*Figure 12: Free Extent List (Extent Based)*

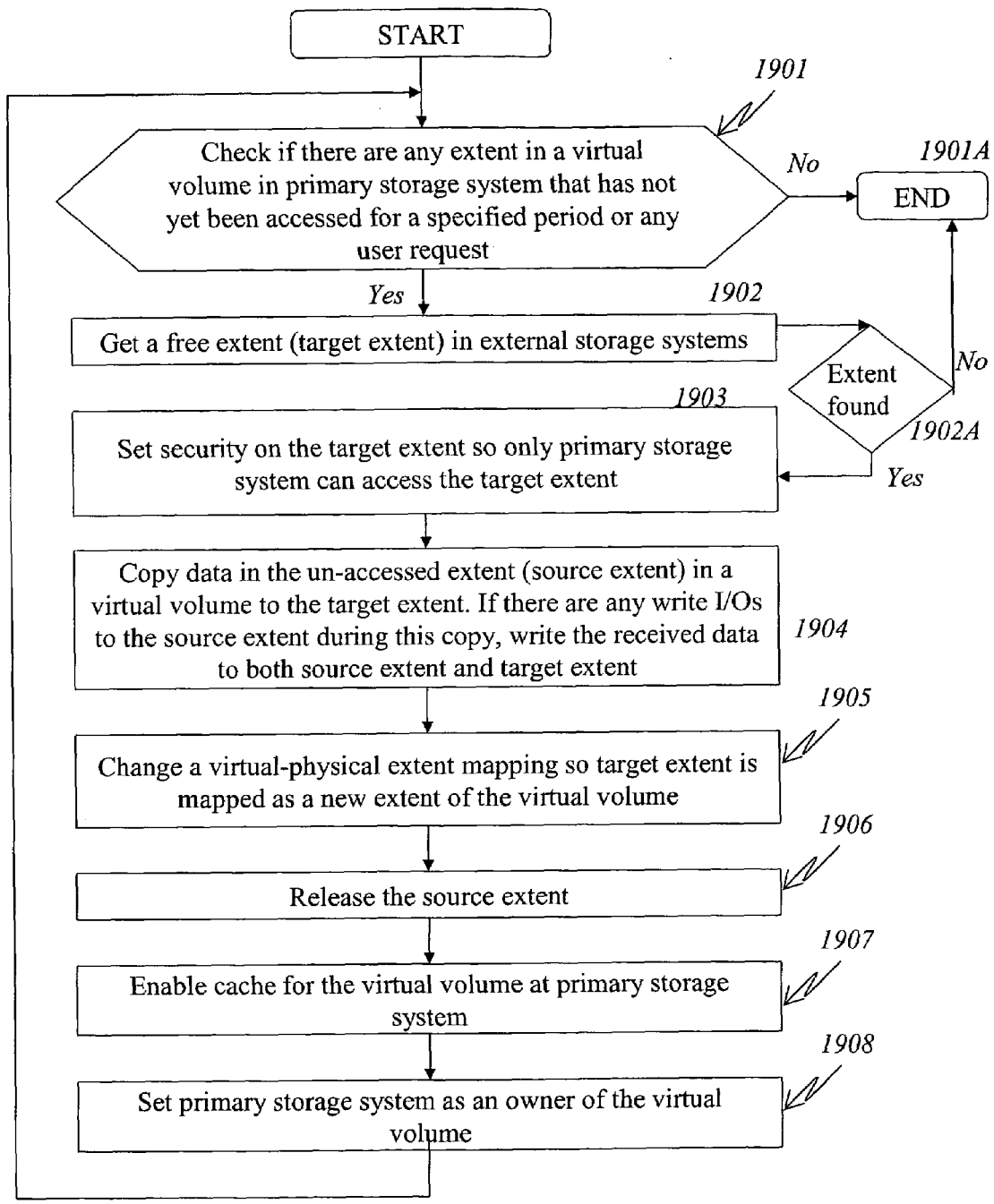
Figure 13: Downward Extent Migration (Extent Based)

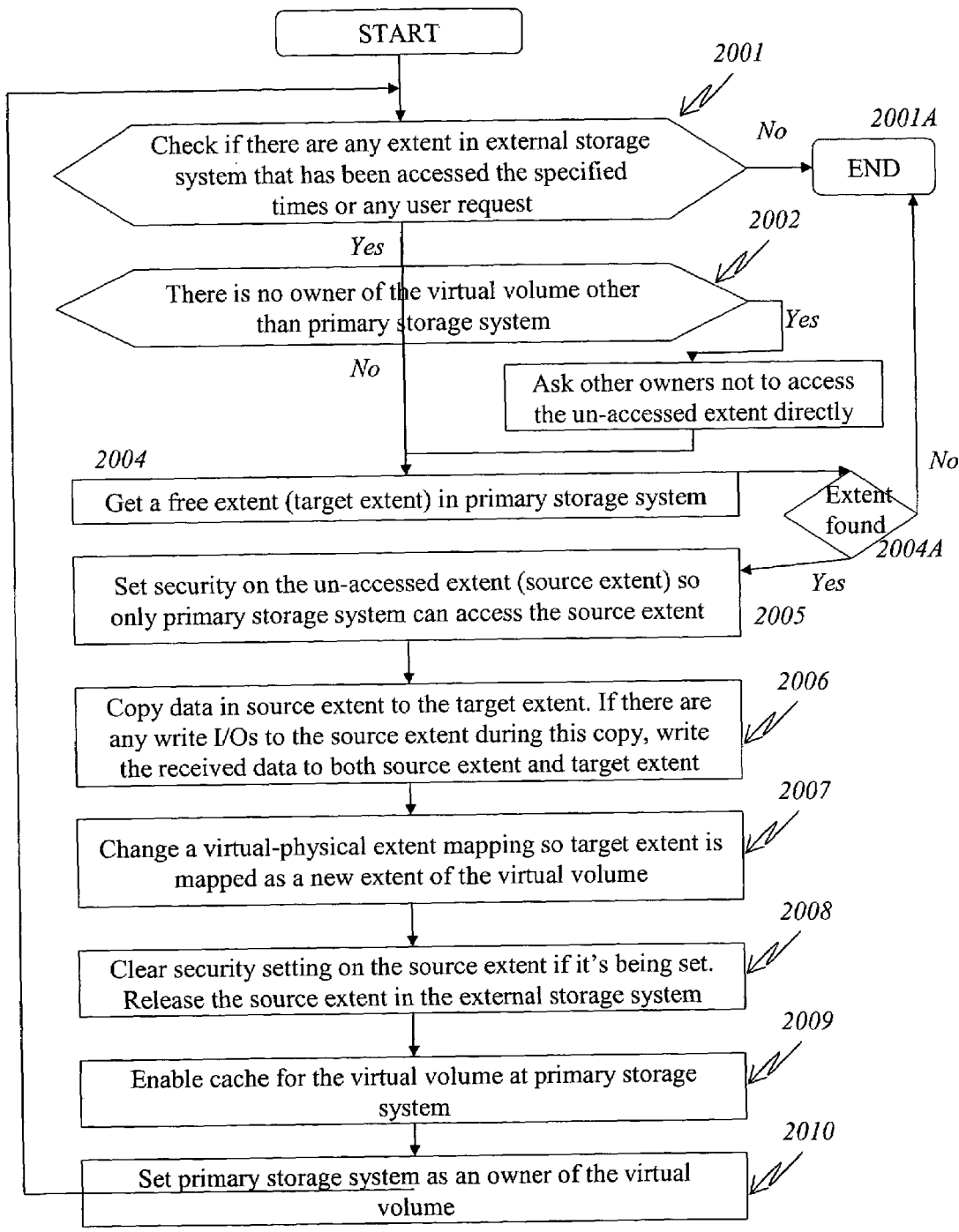
Figure 14: Upward Extent Migration (Extent Based)

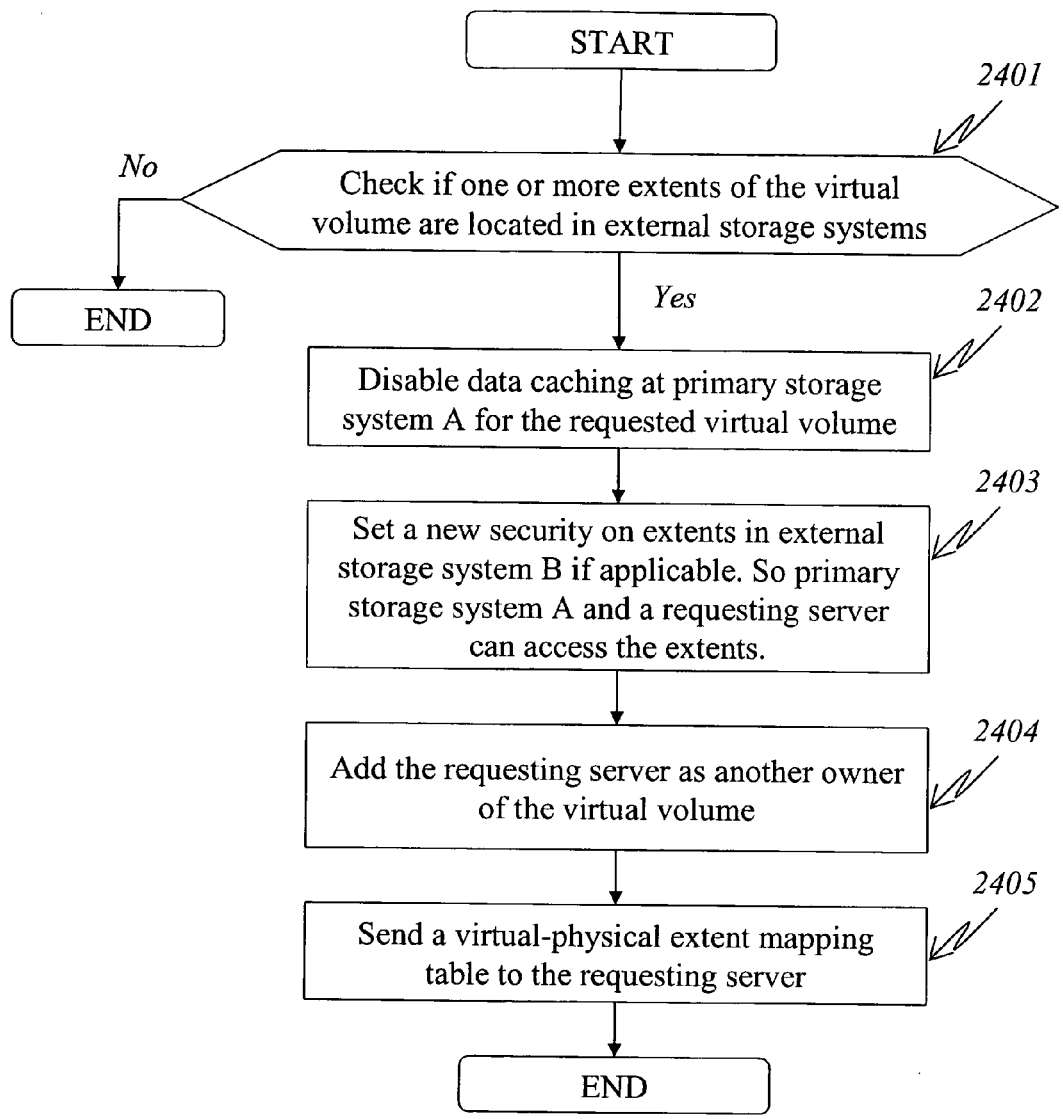
Figure 15: Processing Direct Extent Access Request (Extent Based)

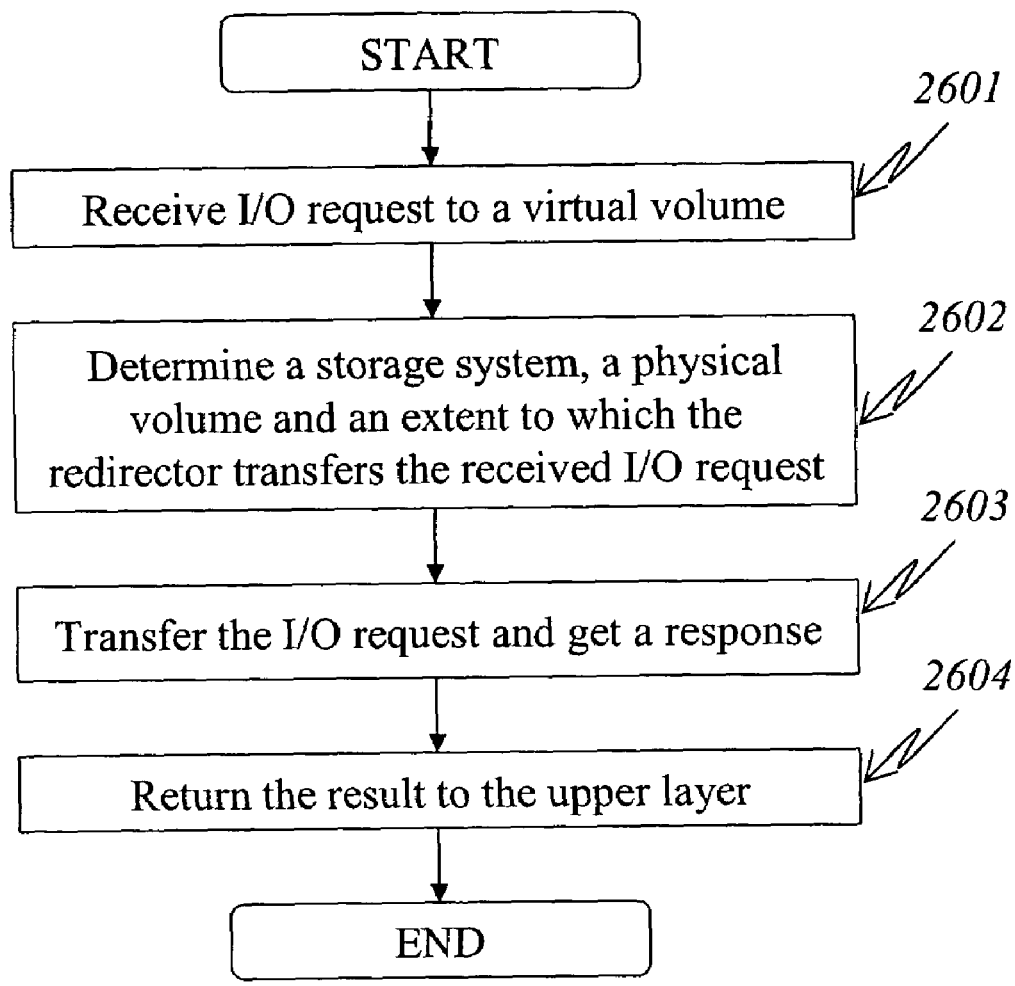
Figure 16: Redirector (Extent Based)

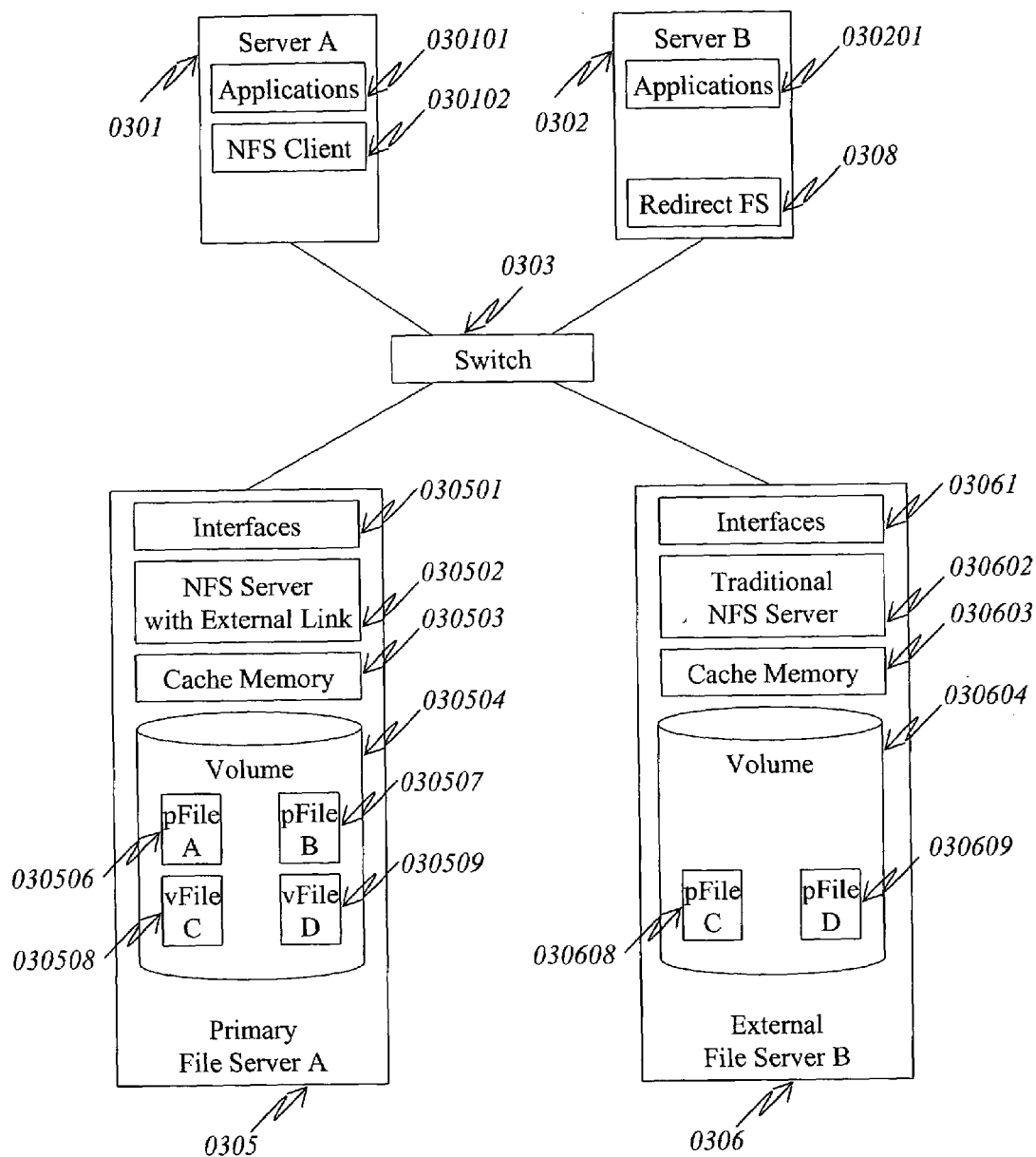
Figure 17: System Configuration C (File or Object Based System)

| Virtual Files | File Servers | File Names | |
|---|---|---|---|
| vFile3 | File Server B | pFile3 | 0701 |
| vFile4 | File Server B | pFile4 | |

*Figure 18: Virtual-Physical File Mapping Table of File Server A and Virtual-Physical File Mapping Table of Server B (File Based)*

| Virtual Files | Cache | Owners | |
|---|---|---|---|
| vFile3 | Yes | Storage System A | 1201 |
| vFile4 | No | Storage System A, Server B | |
| vFile5 | Yes | Storage System A | |
| vFile6 | No | Storage System A, Server B | |

*Figure 19: Virtual File Management Table (File)*

| File Server (Or OSD) | Free Capacity | |
|---|---|---|
| File Server A | 200GB | 1601 |
| File Server B | 1TB | |
| File Server C | 500GB | |
| File Server D | 10GB | |

*Figure 20: Available Capacity Table (File)*

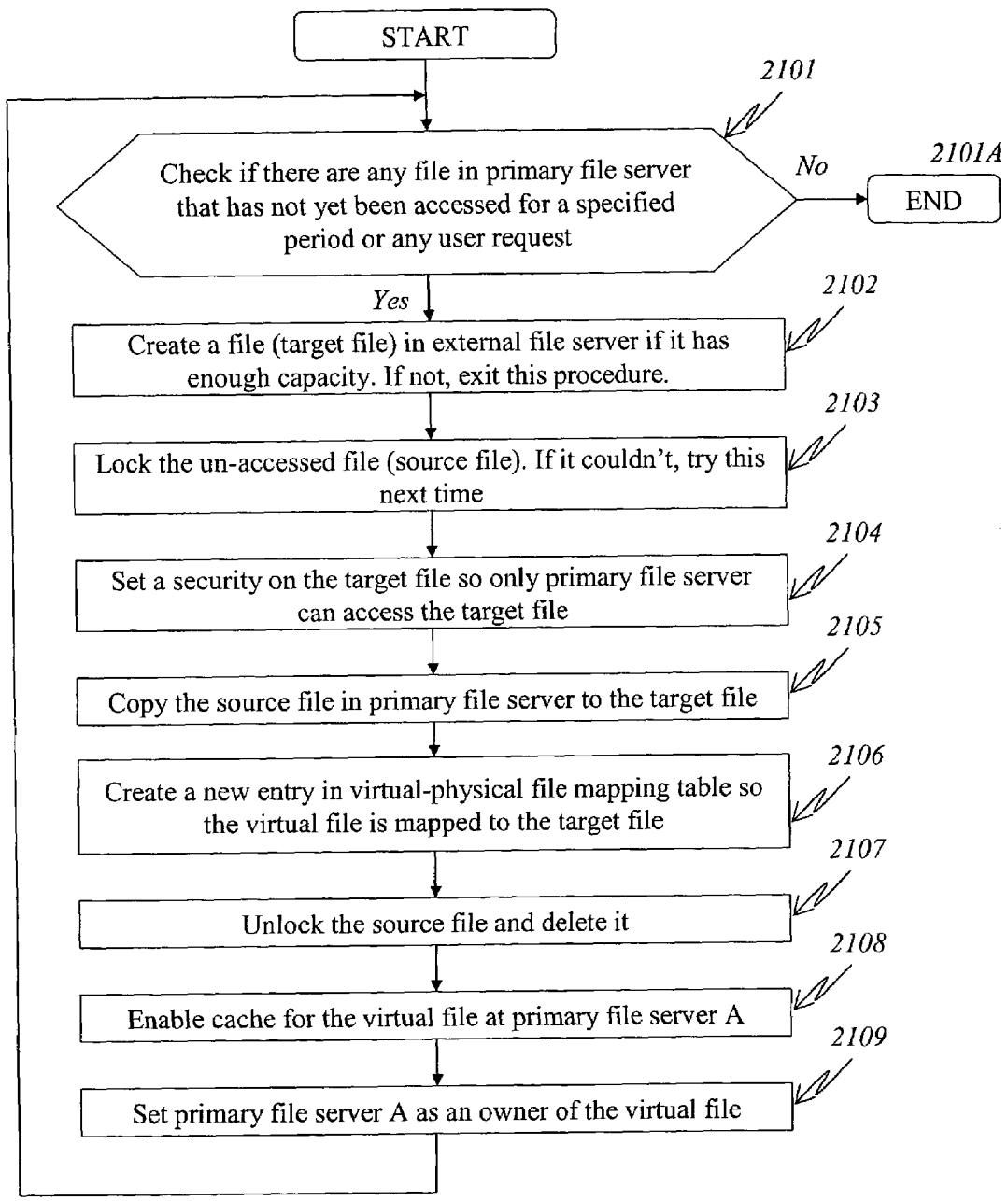
Figure 21: Downward File Migration (File Based)

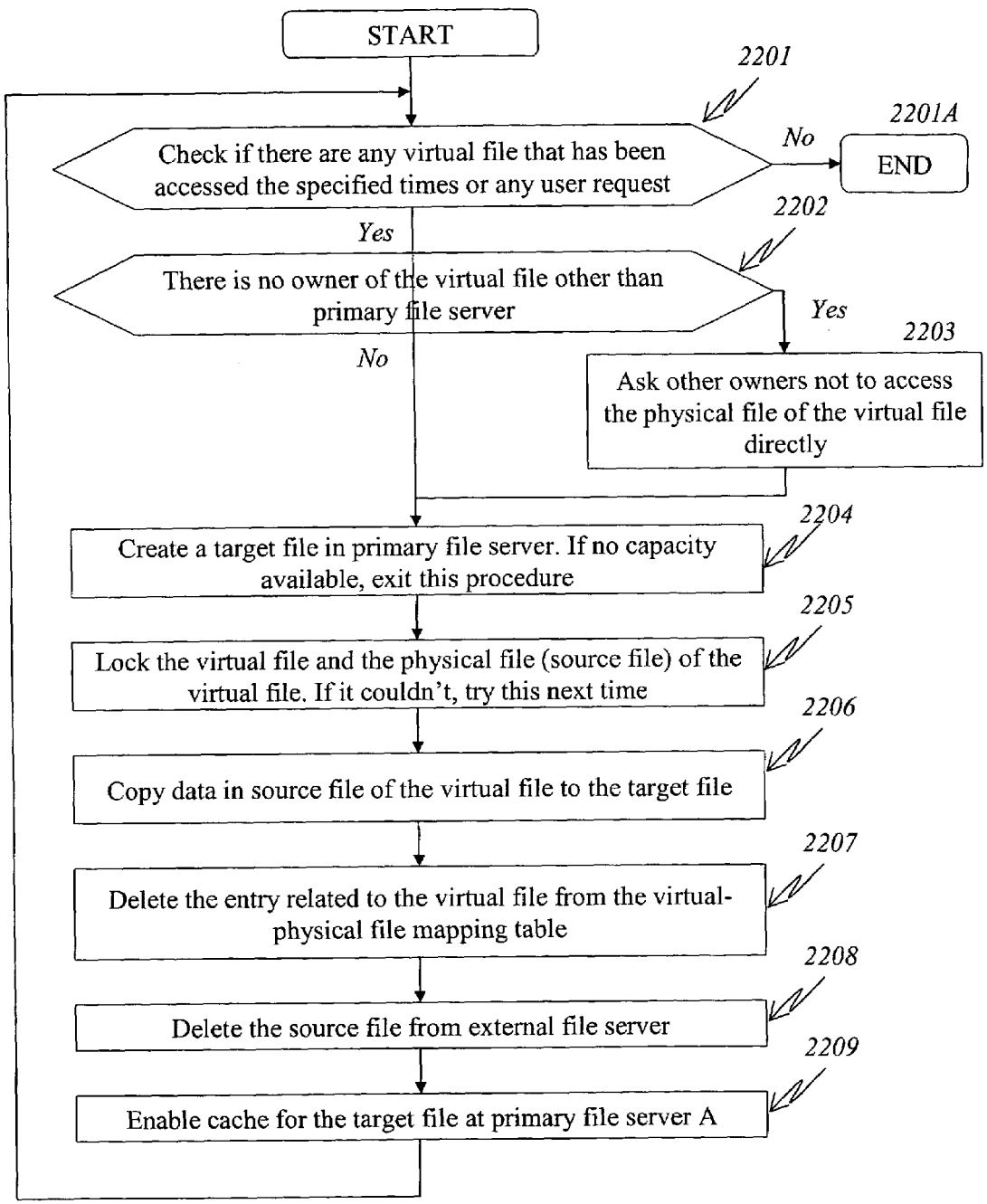
Figure 22: Upward File Migration (File Based)

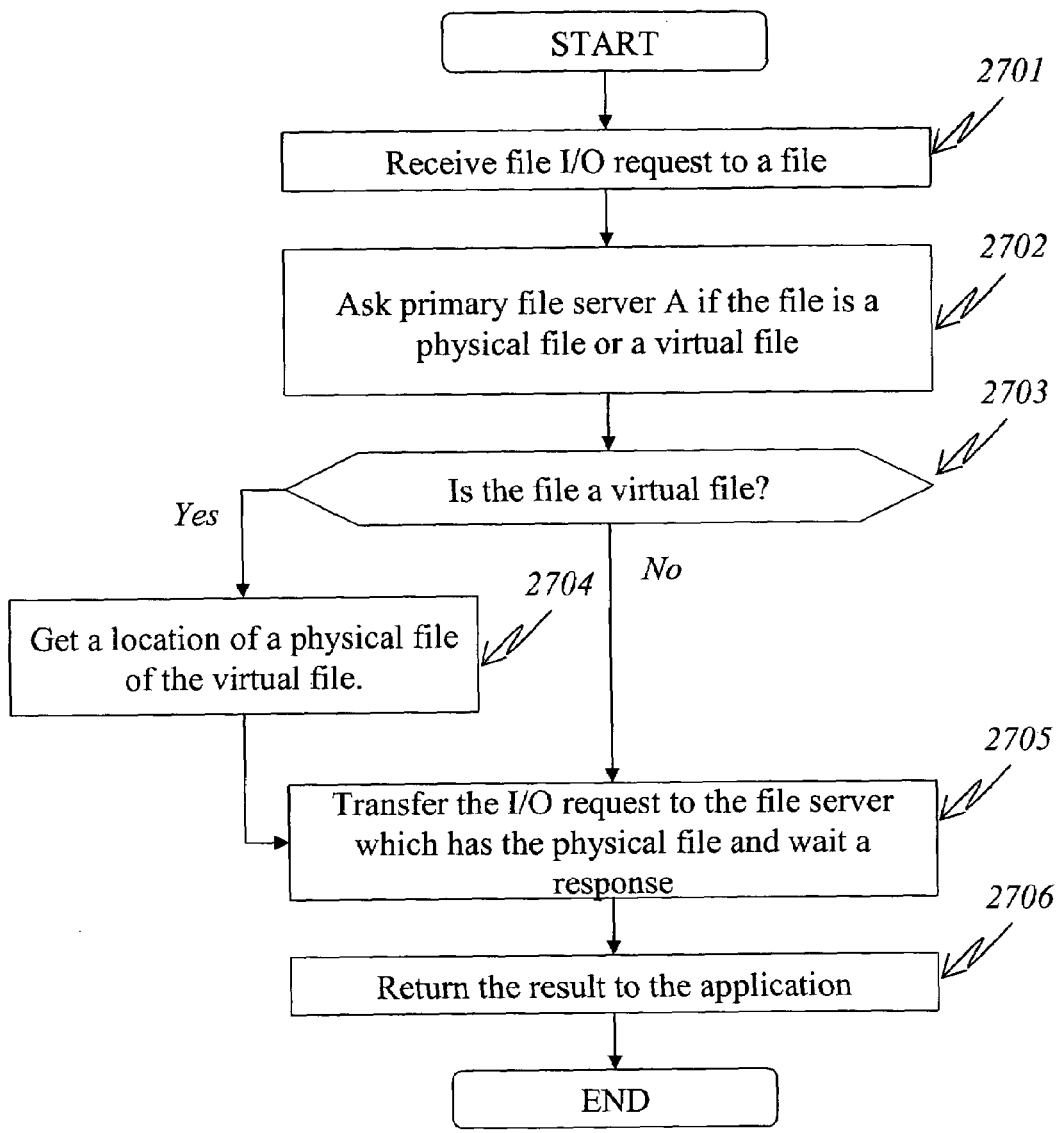
Figure 23: Redirect FS (File Based)

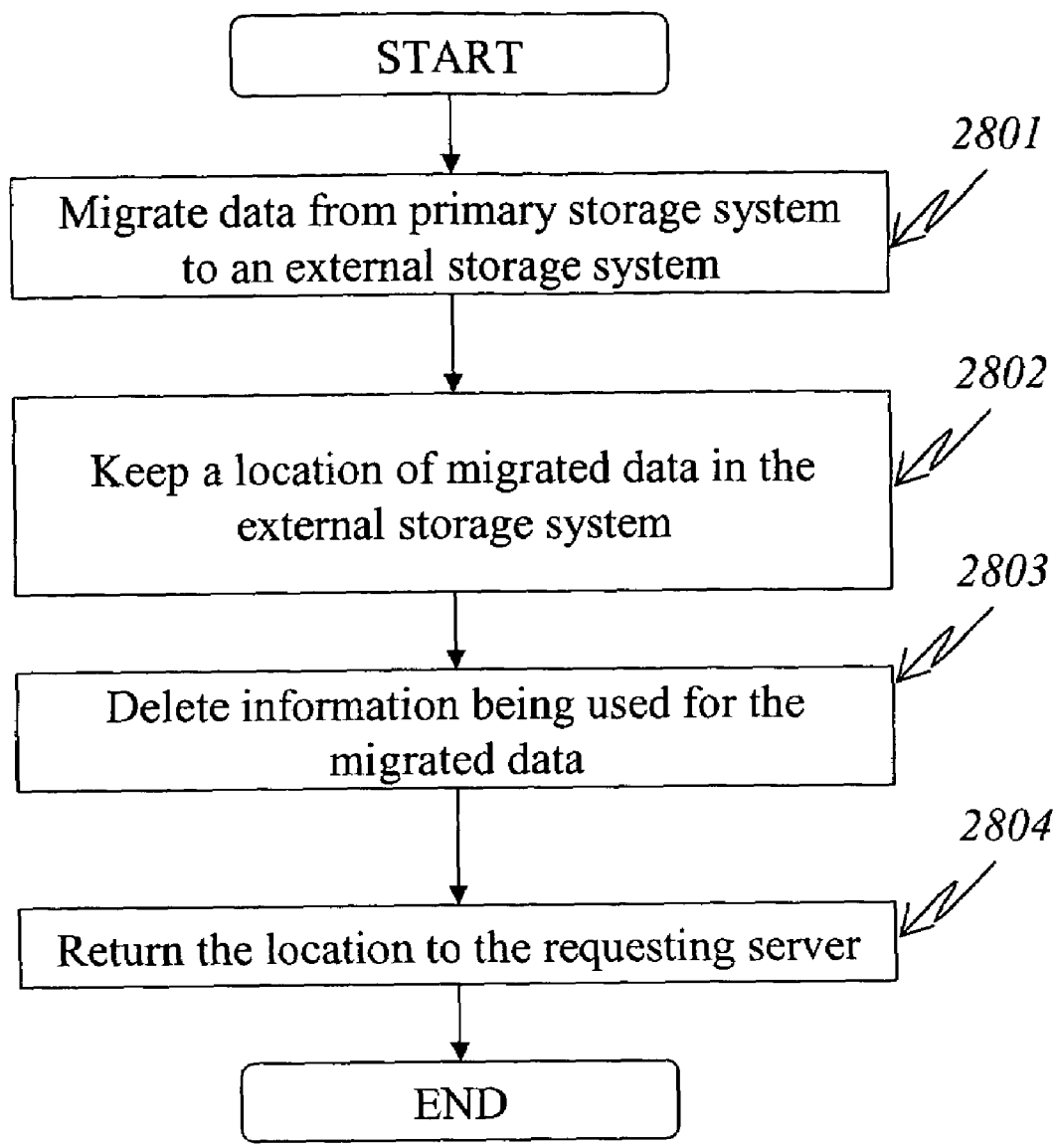
Figure 24: Split

| Virtual Objects | OSDs | Physical Objects |
|---|---|---|
| vOID3 | OSD B | pOID3 |
| vOID4 | OSD B | pOID4 |

*Figure 25: Virtual-Physical Object Mapping Table of OSD A (Object Based)*

| Virtual Files | OSDs | Physical Objects |
|---|---|---|
| vFile3 | OSD B | pOID3 |
| vFile4 | OSD B | pOID4 |

*Figure 26: Virtual-Physical File-Object Mapping Table of File Server A (File & Object Mixed)*

| Virtual Objects | Cache | Owners | |
|---|---|---|---|
| vOID3 | Yes | Storage System A | 1301 |
| vOID4 | No | Storage System A, Server B | |
| vOID5 | Yes | Storage System A | |
| vOID6 | No | Storage System A, Server B | |

*Figure 27: Virtual Object Management Table (File)*

| Virtual Files | Offsets | Storage Systems | Physical Volumes | Extents |
|---|---|---|---|---|
| vFile3 | 0 | Storage System B | PVol3 | Extent31 |
| | 100 | Storage System B | PVol4 | Extent41 |
| | 200 | Storage System B | PVol4 | Extent42 |
| vFile4 | 0 | Storage System B | PVol3 | Extent32 |
| | 100 | Storage System B | PVol4 | Extent43 |
| | 200 | Storage System B | PVol3 | Extent33 |

*Figure 28: Virtual-Physical File-Extent Mapping Table of File Server A (File & Extent Mixed)*

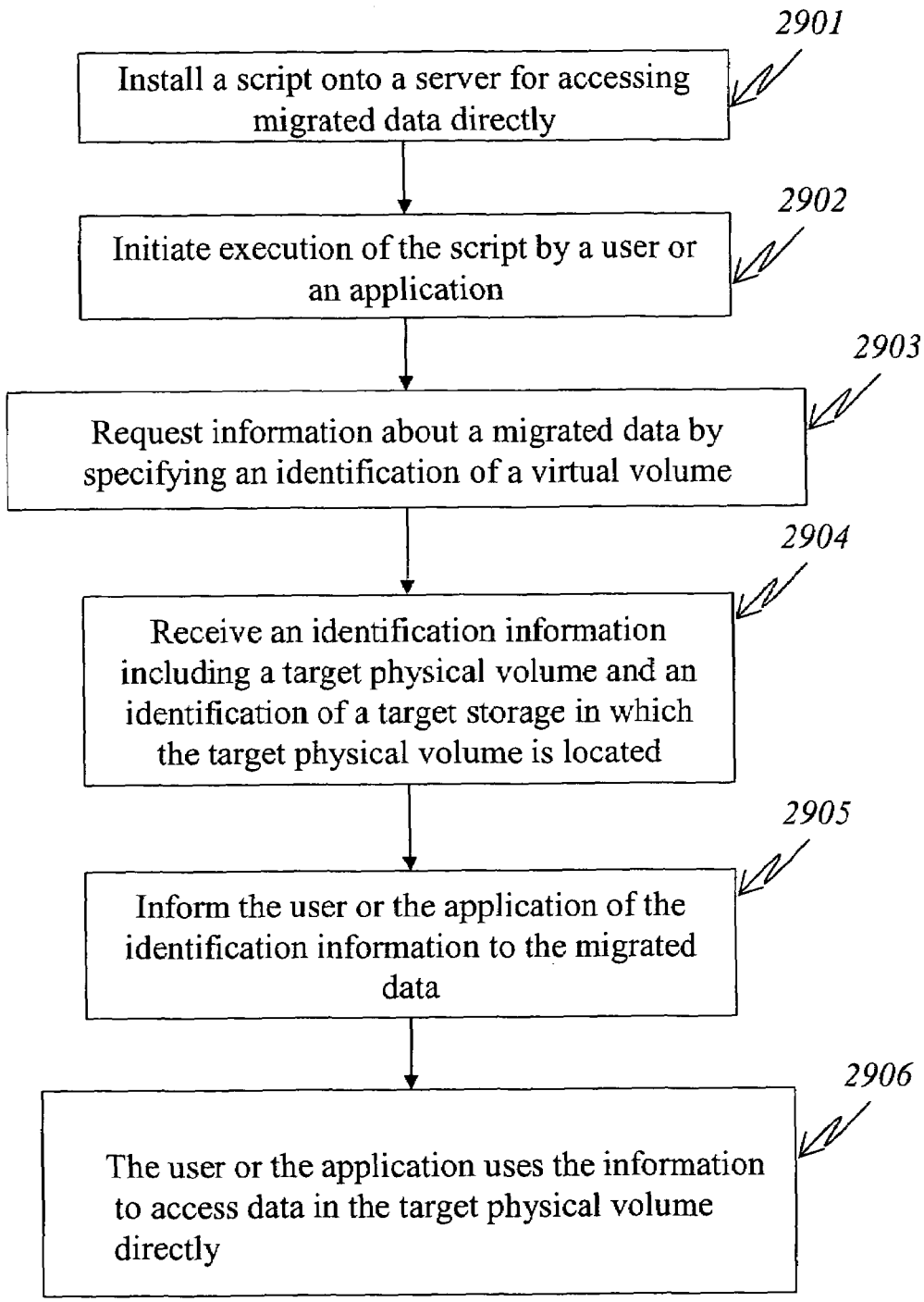
Figure 29: Accessing migrated data directly without a redirector

METHOD AND SYSTEM FOR DATA LIFECYCLE MANAGEMENT IN AN EXTERNAL STORAGE LINKAGE ENVIRONMENT

BACKGROUND

1. Field of the Invention

This invention relates to storage systems, and more specifically to data lifecycle management in storage systems.

2. Description of the Related Art

Storage area networks (SAN) provide a solution for storing and retrieving mass amounts of data. A typical SAN network architecture may consist of one or more host devices interconnected to one or more network devices or switches through an interface. The network devices or switches may then be interconnected to one or more data storage devices through a second network or interface. Many SAN architectures use fiber channel (FC) as the interface or network, however, Ethernet, Infiniband, Internet, and other networks/interfaces may also be used in a SAN architecture.

In current storage networking systems, applications' data are consolidated to central storage systems via a storage network and managed centrally. For example, Hitachi Data System provides Lightning 9900V series as a high-end storage system. Applications' data are stored in storage systems. Brocade provides Silkworm Fibre Channel (FC) switch for creating storage networks. Servers and storage systems are connected via FC switches so applications running on the servers can store data to the storage systems via the network.

Data has its lifecycle. For example, when data is created by an application, the application uses the data frequently. After a time has passed, the data may not be accessed as much, and eventually the data is discarded. Data also has its value. Depending on applications, types of data, business requirements, etc., the value of data will change.

Based on the lifecycle of data, data must be stored in an appropriate storage system. If data is business critical, the data must be stored in the safest storage system and must be available anytime. If data is not so important, storing such data in an expensive storage system with overmuch data protection doesn't make sense.

Data may be moved based on the lifecycle of the data. Data can be moved from one storage system to another storage system when value of data has changed so that the data is stored in an appropriate storage system. Sometimes such data movement is called data migration or data archiving. However, data movement must be done without disrupting applications that are using the data.

A virtual tape system has disk drives for faster data access and multiple tape libraries for storing un-used data. The IBM, Virtual Tape Server Virtual tape server (VTS) is an example of virtual tape storage. A virtual tape system allows servers to read and write data in itself. It provides a tape library interface so servers see virtual tape system as if it were a real tape library. A virtual tape system moves data between disk drives and tape libraries based on the number of accesses to data within a specified time period. This data movement is hidden from servers so there is no interruption on server side. If data was not used frequently, data is moved from disk drives to tape. When data is accessed, data is moved from tape to disk drives. There is a hierarchy between disk drives and tapes. A controller of the virtual tape system manages the data movement. However, this approach is problematic because hierarchical storage management (HSM) such as this doesn't scale. Further, because all access to data must pass through the controller of the virtual tape system, the controller becomes a performance bottleneck, therefore, making it problematic for large-scale systems.

Another approach is HSM software that is installed on servers. SAM-FS is an example of HSM software. HSM software manages disk storage systems and tape libraries which are connected to a server. HSM software moves data between them. HSM software uses the number of data accesses within a specified time period as timing of data movement. All servers who want to access data managed by HSM must have HSM software. However, this approach is problematic because servers without HSM software can't access the data.

SUMMARY OF THE INVENTION

The present invention relates to a system and method for data lifecycle management. In one embodiment, data is migrated to an external storage system. A virtual volume is identified for migration where the virtual volume represents a source physical volume at a primary storage system. A free target physical volume at an external storage system is searched for migration of data from the virtual volume. The data from the source physical volume is copied to the target physical volume. The virtual volume is mapped to the target physical volume. When a request is received at the primary storage system from a server to access the data in the target physical volume, the server is added as an owner of the target physical volume, sent location information of the target physical volume, and allowed to access the target physical volume directly without passing through the primary storage system. The virtual volume for migration may be determined based on not having been accessed for a specified period or having been specified by a user or an application to be migrated. Embodiments of the present invention are applicable to Fibre Channel (FC) storage systems, Network File Server (NAS) or file servers, and Object-based Storage Device (OSD) based storage systems. Therefore, according to embodiments of the present invention, volumes, extents, objects and files may be migrated between primary storage devices or file servers and external storage devices or file servers.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 1 is a diagram of a volume based system according to an example embodiment of the present invention;

FIG. 2 is a diagram of a virtual-physical volume mapping table according to an example embodiment of the present invention;

FIG. 3 is a diagram of a virtual volume management table according to an example embodiment of the present invention;

FIG. 4 is a diagram of a free volume list according to an example embodiment of the present invention;

FIG. 5 is a flowchart of a downward volume migration process according to an example embodiment of the present invention;

FIG. 6 is a flowchart of a upward volume migration process according to an example embodiment of the present invention;

FIG. 7 is a flowchart of processing a direct volume access request according to an example embodiment of the present invention;

FIG. 8 is a flowchart of a volume based redirector process according to an example embodiment of the present invention;

FIG. 9 is a virtual-physical volume mapping table according to an example embodiment of the present invention;

FIG. 10 is a diagram of an extent level system according to an example embodiment of the present invention;

FIG. 11 is a virtual-physical extent mapping table according to an example embodiment of the present invention;

FIG. 12 is a diagram of an extent based free extent list according to an example embodiment of the present invention;

FIG. 13 is a flowchart of a downward extent migration process according to an example embodiment of the present invention;

FIG. 14 is a flowchart of an upward extent migration process according to an example embodiment of the present invention;

FIG. 15 is a diagram of a direct extent access request process according to an example embodiment of the present invention;

FIG. 16 is a flowchart of an extent based redirector process according to an example embodiment of the present invention;

FIG. 17 is a diagram of a file level system according to an example embodiment of the present invention;

FIG. 18 is a diagram of a virtual-physical file mapping table according to an example embodiment of the present invention;

FIG. 19 is a diagram of a virtual file management table according to an example embodiment of the present invention;

FIG. 20 is a diagram of an Available Capacity Table according to an example embodiment of the present invention;

FIG. 21 is a flowchart of a file based downward file migration process according to an example embodiment of the present invention;

FIG. 22 is a flowchart of a file based upward file migration process according to an example embodiment of the present invention;

FIG. 23 is a diagram of a file based redirect FS process according to an example embodiment of the present invention;

FIG. 24 is a flowchart of a split process according to an example embodiment of the present invention;

FIG. 25 is a diagram of a virtual-physical object mapping table for an OSD based system according to an example embodiment of the present invention;

FIG. 26 is a diagram of a virtual-physical file-object mapping table for file and OSD mixed system according to an example embodiment of the present invention;

FIG. 27 is a diagram of a virtual object management table according to an example embodiment of the present invention;

FIG. 28 is a diagram of a virtual-physical file-extent mapping table for file and extent mixed system according to an example embodiment of the present invention; and FIG. 29 is a flowchart of a process for accessing migrated data directly without a redirector according to an example embodiment of the present invention.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to data lifecycle management where a primary storage system has network connections to external storage systems. The primary storage system reads and writes data in the connected external storage systems. Servers have network connections to the primary storage system and the external storage systems. The primary storage system provides a virtual address space for servers. Servers use a virtual address to access data. The primary storage system moves data between internal disk drives and external storage systems. Before and after data movement, the primary storage system doesn't change a virtual address by which the data is accessed. Servers continue to use virtual addresses to access moved data. If a server requested so, the primary storage system tells the server a physical address of data in external storage systems. Then the server accesses the data in the external storage system directly. The data access doesn't need to pass through the primary storage system.

The primary storage system tracks a list of servers that are accessing data in the external storage systems directly. Before data is moved back from external storage systems to its internal disk drives, the primary storage system forces the servers to access data via the primary storage system. If there are one or more servers that access data in the external storage system directly, the primary storage system doesn't cache data in its cache memory.

In an embodiment, the primary storage system doesn't allow any servers accessing data in the external storage system if the servers don't request it to the primary storage system. The primary storage system uses access control mechanism that the external storage systems have in order to prevent access from unauthorized servers.

Embodiments of the present invention are applicable to Fibre Channel (FC) storage system, Network File Server (NAS) or file servers, and Object-based Storage Device (OSD) based storage systems. In a case of FC storage system, data is moved at volume level or extent level. In a case of NAS, data is moved at file level. In a case of OSD, data is moved at object level. In a case of volume level data movement, a volume access may be prevented by a locking a volume. In a case of file level data movement and object level data movement, file and object access may be prevented by setting an access control list of files and objects in the external storage systems so that only the primary storage system can access them. In a case of extent level data movement, there is no standard way to control access at extent level. It's possible to implement proprietary data access control mechanism in the external storage systems.

FIG. 1 shows a diagram of a system according to an example embodiment of the present invention. The system may include one or more servers (0101, 0102), one or more switches (0103), one more primary storage systems (0105), and one or more external storage systems (0106). Applications (010101, 010201) run on servers (0101, 0102) and store and access data in storage systems. Applications may use the primary storage system (0105) for storing and accessing data. Data may be stored in external storage systems (0106). Applications (010101, 010201) may read and write data via the primary storage system (0105) by specifying a virtual volume address, which the primary storage system (0105) presents to applications (010101, 010201).

The servers (0101, 0102) may have a redirector (0108). The redirector (0108) provides virtual volumes (0109*c*, 0109*d*) to applications. The applications (010101, 010201) issue I/O requests to the virtual volumes (0109*c*, 0109*d*). The redirector (0108) knows a physical volume to which a virtual volume is mapped, and transfers I/O requests to the physical volume.

The one or more switches (0103) connect servers (0101, 0102) and storage systems and provide data transfers between them. The primary storage system (0105) may read and write data in external storage systems via a network. The switches (0103) may include many types of switches such as, for example, Fibre Channel switch, Ethernet switch, InfiniBand switch, etc.

The primary storage system (0105) stores applications' data and moves data between internal physical volumes (010504, 010505) and physical volumes (010604, 010605) in external storage systems via a switch. The primary storage system (0105) provides virtual volumes (0104*a*, 0104*b*, 0104*c*, 0104*d*) for servers. Servers (0101, 0102) may use identifications or addresses of virtual volumes to specify a location of data. The primary storage system (0105) may manage a mapping between virtual volumes and physical volumes. Even if data in internal physical volumes (010504, 010505) has been moved to physical volumes (010604, 010605) of external storage systems, servers (0101, 0102) may still access this data via the primary storage system (0105) by specifying a virtual volume. A redirector may not be required. The primary storage system (0105) may transfer an I/O request for this data to the corresponding physical volumes (010604, 010605) in the external storage systems.

Both the primary storage systems and the external storage systems may consist of interfaces (010501, 010601), disk controllers (010502, 010602), cache memory (010503, 010603) and physical volumes (010504, 010505, 010604, 010605). A physical network cable connects a port on a switch and an interface of a storage system. The disk controller processes I/O requests received from servers (0101, 0102) and restricts access to physical volumes. Cache memory is used for storing data and provides faster data access than the physical volume. The physical volume may be a disk drive or a set of disk drives configured as RAID.

The external storage system (0106) may be a traditional storage system without any data movement function. According to embodiments of the present invention, the external storage systems may be used for storing data that is moved from the primary storage system. The servers (0101, 0102) may access data in external storage systems if the primary storage system (0105) allows this. The primary storage system (0105) may restrict data access from servers (0101, 0102) to physical volumes (010604, 010605) in the external storage system (0106) by using security, for example, LU security. LU security is an access control mechanism of storage systems and allows only pre-specified servers (0101, 0102) access to physical volumes. Many current storage system products have this function. The security feature may reside at both a primary storage system and an external storage system but primarily controlled by the primary storage system.

FIG. 2 shows a diagram of a virtual-physical volume mapping table according to an example embodiment of the present invention. The primary storage system has virtual-physical volume mapping table (0401). The table lists which virtual volumes are mapped to which physical volumes. The physical volumes may be either internal physical volumes in the primary storage system or physical volumes in the external storage systems. For example, a virtual volume "VVol3*a*" is mapped to a physical volume "PVol3" in an external storage system "storage system B". When the primary storage system receives an I/O request to a virtual volume from a server, the primary storage system determines if the virtual volume is mapped to an internal physical volume or an external physical volume. If the virtual volume is mapped to an internal volume, the primary storage system processes the request internally. If the virtual volume is mapped to an external volume, the primary storage system may transfer the request to the external storage system, which has the physical volume.

FIG. 3 shows a diagram of a virtual volume management table according to an example embodiment of the present invention. The primary storage system may have a virtual volume management table (1101). This table shows for each virtual volume if the primary storage system can cache data for the virtual volume, and also shows owners of the virtual volume.

FIG. 4 shows a diagram of a free volume list according to an example embodiment of the present invention. The primary storage system may have a free volume list (1401). This list shows which physical volumes are currently in use and which physical volumes are un-used. The list may also show a capacity of each physical volume. The list may include information regarding not only internal physical volumes but also physical volumes of external storage systems. The primary storage system may use this table when it moves data from one physical volume to another physical volume. The primary storage system may use this table to find an unused physical volume as a destination.

FIG. 5 shows a flowchart of a downward volume migration process according to an example embodiment of the present invention. A disk controller of a primary storage system may periodically execute this procedure—for example, once an hour. This procedure determines if there are any physical volumes that need to be moved to the external storage systems, and if there are any, the disk controller moves data in the physical volume to an external physical volume. There may be many policies or criteria that may be used to determine physical volumes to be moved. For example, if there were no data access to a virtual volume within a certain time period, e.g. 1 month, the virtual volume may be moved to external. In another example, a user or an application may specify virtual volumes to be moved.

The disk controller finds a virtual volume that has not been accessed for a specified period or a virtual volume specified by a user or an application to move to external [1701]. Preferably, a physical volume to which a virtual volume is mapped is an internal physical volume of the primary storage system. To illustrate the present invention, the physical volume will be called source pvol in this procedure. If there is no such virtual volume, the disk controller exits this procedure [1701A]. The disk controller finds a free physical volume (target pvol) in an external storage system [1702]. The disk controller may use the free volume list to find a free physical volume. Preferably, the capacity of the free physical volume is the same as the capacity of the virtual volume. Once a free physical volume is found, the disk controller changes the free volume list so that the found physical volume is listed as in use. To illustrate the present invention, the found free physical volume will be called target pvol in this procedure. If no free physical volume is found [1702A], the disk controller exits this procedure [1702B].

If a free physical volume is found, the disk controller may set LU security for the target pvol so that only the primary storage system can access the target pvol [1703]. The disk controller copies data in the source pvol to the target pvol via a network connection to the external storage system [1704]. If there are any write I/Os to the virtual volume during this step, the disk controller writes the received data to both the source pvol and the target pvol. The disk controller may use a bitmap table in order to track which disk blocks in the source pvol have been copied to the target pvol.

The disk controller changes the virtual-physical volume mapping table so that the target pvol is mapped to the virtual volume as a new physical volume instead of the source pvol [1705]. Then, the disk controller may transfer any I/O requests for the virtual volume to the target pvol. The disk controller releases the source pvol and changes the free volume list so that the source pvol is not in use [1706]. The disk controller changes the virtual volume management table so that the disk controller can cache data of the virtual volume in the cache memory of the primary storage system [1707]. The disk controller changes the virtual volume management table so that the primary storage system is the only owner of the virtual volume [1708]. No server can access the target pvol by bypassing the primary storage system. After this, the disk controller may repeat this procedure, returning to step 1701.

FIG. 6 shows a flowchart of an upward volume migration process according to an example embodiment of the present invention. A disk controller of the primary storage system may periodically execute this procedure, for example, once every hour. This process may be executed to determine if there are any physical volumes that may need to be moved from the external storage systems to the primary storage system. If there are physical volumes that need to be moved, a disk controller moves data in the physical volume of the external storage system to an internal physical volume of the primary storage system. There are many policies or factors that may be used to determine the physical volumes to be moved. For example, if the number of data accesses to a virtual volume within a certain time period, e.g. 1 month, exceeds a specified count, the physical volume may be moved into internal. In another example, a user or an application may specify physical volumes to be moved.

The disk controller checks if there is a virtual volume to move into internal [1801]. Preferably, a physical volume to which a virtual volume is mapped is a physical volume of the external storage system. The physical volume will be called source pvol to illustrate the invention. If there is no such a virtual volume, the disk controller exits this procedure [1801A]. The disk controller checks if there is any server who owns the virtual volume other than the primary storage system by using the virtual volume management table [1802], and if there is any, the disk controller asks and confirms that the other owners don't access the external storage system for the virtual volume [1803]. If not, goes to step 1804.

The disk controller finds a free internal physical volume in the primary storage system [1804]. The disk controller uses a free volume list to find a free physical volume. Preferably, the capacity of the free physical volume is the same as the capacity of the virtual volume. Once a free physical volume is found, the disk controller may change a free volume list so that the found physical volume is listed as in use. The found free physical volume will be called target pvol to illustrate the present invention. If there was no free physical volume [1804A], the disk controller exits this procedure [1804A].

The disk controller may set a security, e.g. LU security, for the source pvol so that only the primary storage system can access the source pvol [1805]. The disk controller may copy data in the source pvol to the target pvol via a network connection from the external storage system [1806]. If there are any write I/Os to the virtual volume during this process, the disk controller may write the received data to both the source pvol and the target pvol. The disk controller may use a bitmap table in order to track which disk blocks in the source pvol have been copied to the target pvol.

The disk controller may change a virtual-physical volume mapping table so that the target pvol is mapped to the virtual volume as a new physical volume instead of the source pvol [1807]. Then, the disk controller may process any I/O requests for the virtual volume. The disk controller clears the security (e.g., LU security) being set on the source pvol [1808]. The disk controller may then release the source pvol and change the free volume list so that the source pvol is listed as not in use. The disk controller may change the virtual volume management table so that the disk controller can cache data of the virtual volume in the cache memory of the primary storage system [1809]. The disk controller may change the virtual volume management table so that the primary storage system is the only owner of the virtual volume. Thus, no server can access the target pvol bypassing the primary storage system [1810]. The disk controller may repeat this procedure [1801].

FIG. 7 shows a flowchart of processing a direct volume access request according to an example embodiment of the present invention. A redirector may ask the primary storage system to get a virtual-physical mapping of a specific virtual volume. The redirector may use this information in order to access data stored in a physical volume of an external storage system without passing through the primary storage system, thus avoiding a performance bottleneck at the primary storage system. The redirector may also retrieve data much faster because of this direct access. The redirector may use a library or an API to get a mapping table and permission for a direct access. The library or the API may require identification or an address of a virtual volume to which the redirector wants to access directly. The library or the API may initiate this procedure at the primary storage system. The disk controller processes the request.

The disk controller checks if the physical volume being mapped to the specified virtual volume is located in an external storage system [2301], and if not, the disk controller exits this procedure [2301A]. The disk controller may change a virtual volume management table so that data caching for the specified virtual volume at the primary storage system is disabled [2302]. The disk controller may set a security, e.g. LU security, for the physical volume so that the primary storage system, existing owners in the virtual volume management table and the requesting server can access the physical volume [2303]. The disk controller may add the requesting server into the virtual volume management table as another owner of the virtual volume [2304]. The disk controller returns an address of the physical volume and a name of the external storage system to the redirector [2305].

FIG. 8 shows a flowchart of a redirector processes according to an example embodiment of the present invention. A redirector presents to applications virtual volumes at server level. The applications issue I/O requests to the virtual volumes. The redirector determines to whether the I/O requests need to be sent to the primary storage system or the external storage systems. The redirector may periodically request a direct volume access to virtual volumes so that the redirector knows which virtual volumes have been migrated to external storage system. The redirector may also keep a virtual-physical mapping table, possibly obtained from the primary storage system, in its memory.

The redirector receives an I/O request to a virtual volume from an application [2501]. The redirector determines a storage system and a physical volume of the virtual volume by using a virtual-physical volume mapping table [2502]. If there is no virtual-physical volume mapping table related to the virtual volume, or the primary storage system has asked the redirector to access the primary storage system instead of a direct access to the external storage system, the redirector uses the primary storage system and a corresponding virtual volume in the primary storage system. The redirector transfers the received I/O request to the determined storage system and the physical volume and waits for a response from the storage system [2503]. The redirector returns the received result to the application [2504].

FIG. 9 shows a virtual-physical mapping table according to an example embodiment of the present invention. This table identifies virtual volumes and contains information regarding the location of the volumes, an associated storage system, and an associated physical volume for each virtual volume.

FIG. 10 shows a diagram of an extent level system according to an example embodiment of the present invention. The system includes one or more servers (0201, 0202), one or more switches (0203), and one or more primary storage systems (0205). Applications may use the primary storage system (0205) for storing and accessing data. Data may be stored in external storage systems (0206). Applications (020101, 020201) may read and write data via the primary storage system (0205) by specifying a virtual volume address, which the primary storage system (0205) presents to applications (020101,020201).

The servers (0201, 0202) may have a redirector (0207b). The redirector (0107b) provides virtual volumes (0204c, 0204d) to applications. The applications (020101, 020201) issue I/O requests to the virtual volumes (0204c, 0204d). The redirector (0107b) knows a physical volume to which a virtual volume is mapped, and transfers I/O requests to the physical volume.

The one or more switches (0203) connect servers (0201, 0202) and storage systems and provide data transfers between them. The primary storage system (0205) may read and write data in external storage systems via a network. The switches (0203) may include many types of switches such as, for example, Fibre Channel switch, Ethernet switch, InfiniBand switch, etc.

The primary storage system (0205) stores applications' data and moves data between internal physical volumes (020504, 020505) and external physical volumes (020604, 020605) in external storage systems via a switch. The primary storage system (0205) provides virtual volumes (0208a, 0208b, 0208c, 0208d) for servers. The virtual volume configuration in this example embodiment is different from that in FIG. 1. A virtual volume (0204c, 0204d, 0208a, 0208b, 0208c, 0208d) is configured as a set of extents. A physical volume (020504, 020505, 020604, 020605) may be divided to multiple extents. The size of an extent may be fixed or variable. For example, VVol2a (0208b) may consist of an extent p12 (020504b) and an extent p32 (020604b). The extent p12 is a part of a physical volume PVol1 (020504) in the primary storage system (0205) and the extent p32 is a part of a physical volume PVol3 (020604) in the external storage system (0206). If a disk controller of the primary storage system (0205) received an I/O request to a virtual volume, the disk controller may determine which extent the I/O request is directed to. The disk controller then processes the I/O request itself or transfers the I/O request to the external storage system (0206) that has the extent. Therefore, in this example system embodiment, data is moved at an extent level.

Both the primary storage system and the external storage systems may consist of interfaces (020501, 020601), disk controllers (020502, 020602), cache memory (010503, 020603) and physical volumes (020504, 020505, 020604, 020603). A physical network cable connects a port on a switch and an interface of a storage system. The disk controller (020502) processes I/O requests received from servers (0201, 0202) and restricts access to the physical volumes (020504, 020505, 020604, 020603). Cache memory is used for storing data and provides faster data access than the physical volume. The physical volume may be a disk drive or a set of disk drives configured as RAID.

The external storage system (0206) may be a traditional storage system without any data movement function. According to embodiments of the present invention, the external storage systems (0206) may be used for storing data that is moved from the primary storage system (0205). The servers (0201, 0202) may access data in external storage systems (0206) if the primary storage system (0205) allows this. The primary storage system (0205) may restrict data access from servers (0201, 0202) to physical volumes (020604, 020605) in the external storage system (0206) by using, for example, LU security. LU security is an access control mechanism of storage systems and allows only pre-specified servers (0201, 0202) access to physical volumes. Many current storage system products have this function.

FIG. 11 shows a virtual-physical extent mapping table according to an example embodiment of the present invention. The primary storage system may have virtual-physical extent mapping table (0601). This table contains information regarding how a virtual volume is configured, including offsets, location, storage system, physical volume, extent, etc. For example, a virtual volume "VVol3a" may consist of Extent42 of PVol4 of Storage System B, Extent13 of PVol1 of Storage System A, Extent31 of Ovol3 of Storage System B, etc. An extent based virtual volume management table may the same as the volumes based table shown in FIG. 3.

FIG. 12 shows a diagram of an extent based free extent list according to an example embodiment of the present invention. A primary storage system may have a free extent list (1501). This list shows which extents in physical volumes are currently in use and which are currently un-used. The list also may show the size of each extent.

FIG. 13 shows a flowchart of a downward extent migration process according to an example embodiment of the present invention. A disk controller of the primary storage system may periodically execute this procedure, for example, once an hour. This procedure determines if there are any extents that may need to be moved to the external storage systems, and if there are any, the disk controller moves data in the extents to free extents of the external physical volumes. Similar to the volume level system, there may be many policies used to determine the extents to be moved. For example, a disk controller of the primary storage system may count the number of data accesses for each extent.

A disk controller finds an extent to be moved to external. Preferably, the extent is on an internal physical volume of the primary storage system [1901]. The found extent will be called source extent in this procedure. If there is no such extent, the disk controller exits this procedure [1901A]. The disk controller finds a free extent in an external storage system [1902]. The disk controller may use a free extent list to find a free extent. Preferably, the size of the free extent is the same as the size of the source extent. After a free extent is found, the disk controller changes the free extent list so that the found extent is listed as in use. To illustrate the present invention, the found extent will be called a target extent in this procedure. If there was no free extent found [1902A], the disk controller exits this procedure [1901A].

The disk controller sets security for the target extent so that only the primary storage system may access the target extent [1903]. The disk controller may copy data in the source extent to the target extent via a network connection to the external storage system [1904]. If there are any write I/Os to the source extent during this process, the disk controller may write the received data to both the source extent and the target extent. The disk controller may use a bitmap table in order to track which disk blocks in the source extent have been copied to the target extent.

The disk controller may change the virtual-physical volume mapping table so that the target extent is mapped to the virtual volume as a new extent instead of the source extent [1905]. Then, the disk controller may transfer any I/O requests heading to the offset where the target extent is mapped to the target extent. The disk controller releases the source extent and changes the free extent list so that the source extent is not in use [1906]. The disk controller changes the virtual volume management table so that the disk controller can cache data of the virtual volume in the cache memory of the primary storage system [1907]. The disk controller changes the virtual volume management table so that the primary storage system is the only owner of the virtual volume [1908]. Thus, no server can access the target extent by bypassing the primary storage system. The disk controller may then repeat this procedure [1901].

FIG. 14 shows a flowchart of an upward extent migration process according to an example embodiment of the present invention. The disk controller of the primary storage system periodically executes this procedure, for example, once an hour. This process may be used to determine if there are any extents that may need to be moved from the external storage systems to the primary storage system, and if there are any, the disk controller moves data in the extent of the external storage system to an internal extent of the primary storage system. Similar to the volume based system, there are many policies that may be used to determine physical volumes to be moved.

The disk controller finds an extent in the external storage system to move into internal [2001]. The found extent is called source extent in this procedure. If there is no such extent, the disk controller exits this procedure [2001A]. The disk controller checks if there is any server who owns the virtual volume other than the primary storage system [2002]. The disk controller may use a virtual volume management table for this. If there is a server that owns the virtual volume other than the primary storage system, the disk controller asks and confirms that the other owners don't access the external storage system for the virtual volume [2003]. If there is no server that owns the virtual volume other than the primary storage system, the disk controller finds a free internal extent in the primary storage system [2004]. The disk controller may use the free extent list to find a free extent. Preferably, the size of the free extent is the same as the size of the source extent. Once a free extent is found, the disk controller may change the free extent list so that the found extent is listed as in use.

The found extent is called a target extent in this procedure. If there was no free extent found [2004A], the disk controller exits this procedure [2004B]. The disk controller may set a security for the source extent so that only the primary storage system can access the source extent [2005]. The disk controller copies data in the source extent to the target extent via a network connection from the external storage system [2006]. If there are any write I/Os to the source extent during this process, the disk controller may write the received data to both the source extent and the target extent. The disk controller may use a bitmap table to track which disk blocks in the source extent have been copied to the target extent.

The disk controller may change a virtual-physical extent mapping table so that the target extent is mapped to the virtual volume as a new extent instead of the source extent [2007]. The disk controller may clear the security being set on the source extent [2008]. The disk controller may then release the source extent and change the free extent list so that the source extent is listed as not in use. The disk controller may change the virtual volume management table so that the disk controller can cache data of the virtual volume in the cache memory of the primary storage system [2009]. The disk controller changes the virtual volume management table so that the primary storage system is the only owner of the virtual volume [2010]. Therefore, no server can access the target extent by bypassing the primary storage system. The disk controller may then repeat this procedure [2001].

FIG. 15 shows a diagram of a direct extent access request process according to an example embodiment of the present invention. A redirector may ask the primary storage system to get a virtual-physical mapping of a specific virtual volume. The redirector uses this information in order to access data stored in a physical volume of an external storage system without passing through the primary storage system. The redirector may use a library or an API to get a mapping table and permission for a direct access. The library or the API may initiate this process at a primary storage system. The disk controller then processes the request.

The disk controller checks if one or more physical extents being mapped to the specified virtual volume are located in external storage systems [2401], and if not, the disk controller exits this procedure [2401A]. The disk controller changes the virtual volume management table so that data caching for the specified virtual volume at the primary storage system is disabled [2402]. The disk controller may set security for the external extents so that the primary storage system, existing owners in the virtual volume management table and the requesting server can access the external extents [2403]. The disk controller adds the requesting server into the virtual volume management table as another owner of the virtual volume [2404]. The disk controller returns a virtual-physical extent mapping table related to the virtual volume to the redirector [2405].

FIG. 16 shows a flowchart of a redirector process according to an example embodiment of the present invention. A redirector may present to applications virtual volumes at the server level. The applications issue I/O requests to the virtual volumes. Depending on an offset set in the request, the redirector determines where the I/O requests need to be sent, the primary storage system or the external storage systems. The redirector may periodically request a direct extent access to virtual volumes. Thus, the redirector may get a virtual-physical mapping table of a virtual volume from the primary storage system and keeps it in its memory.

The redirector receives an I/O request to a virtual volume from an application [2601]. The redirector determines a storage system, a physical volume of the virtual volume and an extent by using a virtual-physical extent mapping table [2602]. If there is no virtual-physical extent mapping table related to the virtual volume, or the primary storage system has asked the redirector to access the primary storage system instead of direct access to the external storage system, the redirector may use the primary storage system and a corresponding virtual volume in the primary storage system. The redirector transfers the received I/O request to the determined storage system and waits for a response from the storage system [2603]. The redirector returns the received result to the application [2604].

FIG. 17 shows a diagram of a file level system according to an example embodiment of the present invention. The system may include one or more servers (0301, 0302), one or more switches (0303), one more primary file servers (0305), and one or more external file servers (0306). In this embodiment, servers read and write files in the primary file server (0305). NFS (Network File System) is a standard network file sharing protocol used between servers and file servers that may be used in this embodiment. OSD (Object-based Storage Device) may also be used in systems according to this embodiment of the present invention.

An NFS client (030102) running on a server may accept file I/O requests from applications (030101) and transfer the requests to the primary file server. The servers may have a redirect file system (redirect FS, 0308). The redirect FS (0308) provides the virtual file system to the applications. The applications may issue file I/O requests to the virtual file system. The redirect FS (0308) determines if a file name specified in the request is mapped to a physical file in an external file server, and if it is, the redirect FS (0308) gets a name of the external file server (0306) and a file name of the physical file from the primary file server. The redirect FS (0308) transfers file I/O requests to the external file server. If a file name specified in the request is not mapped to a physical file in an external file server, the redirect FS (0308) transfers the requests to the primary file server.

Switch 0303 may be an Ethernet switch—for NFS access, or a Fibre Channel switch—for OSD access. An InfiniBand switch may also be used.

The primary file server (0305) provides file level data access for servers. The primary file server (0305) stores files in its internal volume. There may be two types of files, one is a physical file (030506, 030507), and the other is a virtual file (030508, 030509). A physical file is a real file with data stored in the internal volume of the primary file server. A virtual file is a link to a real file with data is stored in the external file server. If an NFS server receives a file I/O request for a virtual file, the NFS server may transfer the request to the external file server (0306) which has a physical file mapped to the virtual file. The primary file server (0305) may connect to external file servers and may read and write files in the external file servers via a network. The external file server (0306) may be a traditional file server.

FIG. 18 shows a diagram of a virtual-physical file mapping table according to an example embodiment of the present invention. The primary file server (0305) may have a virtual-physical file mapping table (0701). This table contains information including a link between a virtual file and a physical file. For example, a virtual file "vFile3" is linked to a physical file "pFile3" in a file server "File Server B".

FIG. 19 shows a diagram of a virtual file management table according to an example embodiment of the present invention. A primary file server (0305) may have a virtual file management table (1201). This table may show for each virtual file if its data can be cached at the primary file server. It also may show owners of the virtual file.

FIG. 20 shows a diagram of an Available Capacity Table according to an example embodiment of the present invention. A primary storage system may have an available capacity table (1601). This table may include how much free capacity each file server has.

Procedures

FIG. 21 shows a flowchart of a file based downward file migration process according to an example embodiment of the present invention. An NFS server of a primary file server may periodically execute this procedure, for example, once an hour. This procedure may be executed to determine if there are any physical files that may need to be moved to the external file servers, and if there, the NFS server moves the files to the external file servers. Similar to the volume level system, there may be many policies used to determine files to be moved. The NFS server of the primary file server may count the number of data accesses for each file, for example.

The NFS server finds a physical file to be moved to an external file server [2101]. Preferably, the physical file is in an internal volume of the primary file server. The found physical file will be called a source file to illustrate this procedure. If there is no such file, the NFS server exits this procedure [2101A]. The NFS server creates a file in an external file server [2102]. The NFS server may use an available capacity table to find the external file server. The available capacity of the external file server must be larger than the size of the source file. When the file is created, the NFS server may change an available capacity table to show the capacity was used for moving the file. The created file will be called a target file in this procedure. If there was no available capacity, the NFS server exits this procedure.

The NFS server locks the source file. If the NFS server cannot lock the source file, the NFS server tries this the next time [2103]. The NFS server sets security for the target file so that only the primary file server can access the target file [2104]. The NFS server copies the source file in the primary file server to the target file [2105]. Thus, no server can access the source file because access to it is locked. The NFS server may create a new entry in a virtual physical file mapping table so that the virtual file is linked to the target file [2106]. A file name of the virtual file is same as a file name of the source file. Even after the source file is deleted, a server may be able to access the target file by specifying the file name of the virtual file. The NFS server unlocks the source file and deletes it [2107]. The NFS server may change the virtual file management table so that the NFS server can cache data of the virtual file in the cache memory of the primary file server [2108]. The NFS server changes the virtual file management table so that the primary file server is the only owner of the virtual file [2109]. Thus, no server can access the target file by bypassing the primary file server. The NFS server may repeat this procedure [2101].

FIG. 22 is a flowchart of a file based upward file migration process according to an example embodiment of the present invention. An NFS server of the primary file server may periodically execute this process, for example, once an hour. This process determines if there are any virtual files that need to be moved from the external file server to the primary file server, and if there are any, the NFS server moves the physical file in the external storage system to an internal volume of the primary file server. Similar to the volume based system, there are many policies to determine the virtual files to be moved.

An NFS server finds a virtual file in the external file server to move into an internal file server. This may be based on how many times the virtual file has been accessed or any user request [2201]. The physical file mapped to the found virtual file is called source file in this procedure. If there is no such virtual file, the NFS server exits this procedure [2201A]. The NFS server checks if there is any server who owns the virtual file other than the primary file server by using the virtual file management table [2202], and if there is, the NFS server asks and confirms that the other owners don't access the external file server for the virtual file [2203]. If there is no server who owns the virtual file other than the primary file server, the NFS server creates a target file in the internal volume [2204]. The file name of the target file is same as the file name of the virtual file. Available capacity of the primary file server must be larger than the size of the source file. If no capacity is available in the internal volume, NFS server exits this procedure. The NFS server locks the virtual file and its source file. If locking the virtual file and its source file is not possible, the NFS server tries this next time [2205]. The NFS server copies the source file to the target file [2206]. The NFS server deletes an entry for the virtual file from the virtual-physical file mapping table [2207]. The NFS server unlocks the source file and deletes it [2208]. The NFS server changes the virtual file management table so that the NFS server can cache data of the virtual file in the cache memory of the primary file server [2209].

FIG. 23 shows a diagram of a file based redirect FS process according to an example embodiment of the present invention. A redirect FS presents an application a virtual file system at server level. The applications issue file I/O requests to the virtual file system. The redirect FS receives the requests and asks the primary file server about a physical file of the virtual file. Depending on a location of the physical file, the Redirect FS determines where the file I/O requests need to be sent, the primary file server or the external file servers.

The redirect FS receives a file I/O request to a virtual file system from an application [2701]. The redirect FS asks the primary file server if the requested file is a physical file or a virtual file [2702]. It is determined if it is a virtual file [2703], and if so, the redirect FS gets a file name of a physical file linked to the virtual file and a name of an external file server that has the physical file.2704. If it is not a virtual file, the redirect FS transfers the file I/O request to the file server that has the physical file [2705], and then the redirect FS waits for a response from the file server. The redirect FS returns the result to the application [2706].

FIG. 24 shows a flowchart of a split process according to an example embodiment of the present invention. In some cases, after data is moved to an external storage system, there may be no need to keep a relationship between the moved data and the primary storage system. This reduces the amount of management data required in the primary storage system. A split provides a way to cut the relationship.

If a disk controller of the primary storage system receives a split request from a server, the disk controller migrates the specified data from the primary storage system to the external storage system. The entire data is moved to the external storage system [2801]. The disk controller may keep a location of the migrated data in its memory [2802]. The disk controller may then delete management data being used for the migrated data [2803]. The disk controller returns the location information to the server. Thus, the server still can access to the migrated data without the primary storage system [2804].

FIG. 25 shows a diagram of a virtual-physical object mapping table for an OSD based system according to an example embodiment of the present invention. Similar to the file based system, a virtual object is introduced and linked to a physical object in external OSD. Redirect FS uses OSD protocol instead of NFS to access an object.

FIG. 26 shows a diagram of a virtual-physical file-object mapping table for file and OSD mixed system according to an example embodiment of the present invention. Servers may store data as files into the primary file system by using an NFS protocol. Files may then be migrated to external OSDs as objects. A redirect FS asks the primary file server a mapping relationship between a file and an object and then accesses the object in an external OSD directly to get a migrated file.

FIG. 27 shows a diagram of a virtual object management table according to an example embodiment of the present invention. A primary file server may have a virtual object management table (1301). This table may show for each virtual object if its data can be cached at the primary file server. It also may show owners of the virtual file.

FIG. 28 shows a diagram of a virtual-physical file-extent mapping table for file and extent mixed system according to an example embodiment of the present invention. The servers may store data as files into the primary file system by using NFS protocol. Files may then be migrated to external storage system as a set of extents or disk blocks. A redirect FS asks the primary file server a mapping relationship between a file and the set of the extents or the disk blocks and then accesses the extents or the disk blocks in an external storage system directly to get a migrated file. A file may be mapped to multiple extents that may reside on multiple storage systems.

FIG. 29 shows a flowchart of a process for accessing migrated data directly without a redirector according to an example embodiment of the present invention. Even if a server doesn't have any redirector in it, it is possible for the server to access migrated data in a target physical volume directly via a network switch. A script for accessing migrated data directly is installed on the server [2901]. A user or an application executes the script [2902]. The script communicates to a primary storage in order to get information about a migrated data by specifying an identification of a virtual volume [2903]. The primary storage returns an identification of a target physical volume containing the migrated data and an identification of a target storage in which the target physical volume is located [2904]. Then the script tells the user or the application the identification information to the migrated data [2905]. Finally the user or the application uses the information to access data in the target physical volume directly [2906]. In this case, because there is no way for the primary storage to ask the server not to use the target physical volume directly, it is preferable that the primary storage system doesn't move the migrated data back to its local storage or the association between a virtual volume and the target physical volume is splitted.

According to embodiments of the present invention, when data was migrated to a target physical volume, a LUN security function of a target storage may be used to restrict which servers can access to the target physical volume. It is also possible that the migrated data in the target physical volume is protected by using a WORM or a logical device (LDEV) guard function of the target storage system. A LDEV guard doesn't allow any server to modify data on a physical volume. Only read access is allowed. When data was migrated to the target physical volume, the primary storage may protect the volume by using a LDEV guard function of the target storage. This is useful for long term data archiving for regulatory compliance requirements. Some regulations require companies not to modify any data within a specified period, e.g. 4 years. To ensure no-modification of data, a LDEV guard may be used. However, it may be expensive to store such data in the primary storage so embodiments of the present invention provide for moving such data to the external storage then protecting the data by using a LDEV guard function. Thus, any hosts can access the protected data directly without passing though the primary storage. The present invention is not limited to the use of a WORM or LDEV guard functions as any other type protection may be implemented for protecting a target physical volume and still be within the scope of the present invention.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A system for data lifecycle management comprising:
at least one server, at least one said server having applications that generate I/O requests to store and access data in storage systems, at least one said server having a redirector that provides first virtual volumes to said applications, receives said I/O requests from said servers and transfers the I/O requests to said storage systems, said redirector having knowledge of which first virtual volumes are mapped to which physical volumes located in the storage systems;
a primary storage system, the primary storage system being one of said storage systems and including a first disk controller, a cache memory, at least one said physical volume, and at least one second virtual volume, the primary storage system managing the mapping between the second virtual volumes and an associated said physical volumes;
an external storage system, the external storage system being one of said storage systems and including a second disk controller, a second cache memory, at least one said physical volume; and
at least one switch operatively connected between said at least one server and the primary storage system and the external storage system,
wherein said first disk controller executes a data migration procedure that migrates data between said at least one physical volume at said primary storage system and said at least one physical volume at said external storage system based on an amount of accesses to said data in said at least one second virtual volume, and wherein when a request is received at the primary storage system from a server to access the data in the at least one physical volume at the external storage system, the server is added as an owner of the at least one physical volume at the external storage system, sent location information of the at least one physical volume at the external storage system, and allowed to access the at least one physical volume at the external storage system directly without passing through the primary storage system, and
wherein the primary storage system further comprises a virtual volume management table that provides information for each virtual volume whether data for the virtual volume can be cached at the primary storage system and virtual volume owners.

2. The system according to claim 1, wherein the primary storage system further comprises a virtual-physical volume mapping table that shows a mapping between a virtual volume and a physical volume.

3. The system according to claim 1, wherein the primary storage system further comprises a free volume list showing which physical volumes are being used or are un-used and a capacity of each physical volume.

4. The system according to claim 1, wherein said first virtual volumes and said at least one second virtual volumes are configured as a set of extents, said physical volumes being divided into multiple extents, said I/O requests being directed to an extent, said data migration procedure migrating data in an extent between said at least one physical volume at said primary storage system and said at least one physical volume at said external storage system based on an amount of accesses to said extent data in said at least one second virtual volume.

5. The system according to claim 4, wherein the primary storage system contains a virtual-physical extent mapping table that shows how a virtual volume is configured.

6. The system according to claim 4, wherein the primary storage system contains a free extent list that shows which extents in physical volumes are being used or un-used and the size of each extent.

7. A network file system (NFS) for data lifecycle management comprising:
- at least one server, the at least one said server having applications that generate file I/O requests to store and access files in storage systems and a NFS client, at least one said server having a redirector that provides a virtual file system to said applications and redirects the I/O requests to an appropriate file server based on a file name mapping;
- a primary file server including a first NFS server, a cache memory, at least one physical volume including a virtual file and a physical file, the virtual file being a link to the physical file;
- an external file server including a second NFS server, a cache memory, at least one physical volume including a physical file; and
- at least one switch operatively connected between said at least one server and the primary file server and the external file server,
- wherein said first NES server executes a data migration procedure that migrates files between said at least one physical volume at said primary file server and said at least one physical volume at said external file server based on an amount of accesses to said files, and wherein when a request is received at the primary file server from a second file server to access the data in files at the at least one physical volume at the external file server, the second file server is added as an owner of the files of the at least one physical volume at the external file server, sent location information of the files of the at least one physical volume at the external file server, and allowed to access the files of the at least one physical volume at the external file server directly without passing through the primary file server, and
- wherein the primary file server further comprises a virtual file management table that provides information whether data at a virtual file can be cached at the primary file server and virtual file owners.

8. The system according to claim 7, wherein the primary file server further comprises a virtual-physical file mapping table that shows a link between a virtual file and a physical file.

9. The system according to claim 7, wherein the primary file server further comprises an available capacity table showing how much free capacity each file server has.

* * * * *